US007043030B1

(12) United States Patent
Furuta

(10) Patent No.: US 7,043,030 B1
(45) Date of Patent: May 9, 2006

(54) NOISE SUPPRESSION DEVICE

(75) Inventor: Satoru Furuta, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1007 days.

(21) Appl. No.: 09/587,612

(22) Filed: Jun. 5, 2000

(30) Foreign Application Priority Data

Jun. 9, 1999 (JP) ................................ 11-162240

(51) Int. Cl.
*H04B 15/00* (2006.01)

(52) U.S. Cl. .................. 381/94.1; 381/94.2; 381/94.3; 704/226

(58) Field of Classification Search ............... 381/94.1, 381/94.2, 94.3; 704/226, 220, 221, 227, 704/228, 206–10; 361/2
See application file for complete search history.

(56) References Cited

U.S. PATENT DOCUMENTS 5,742,927 A * 4/1998 Crozier et al. .............. 704/226
6,044,341 A * 3/2000 Takahashi ................... 704/226
6,591,234 B1 * 7/2003 Chandran et al. ........... 704/225

FOREIGN PATENT DOCUMENTS

JP 9-212196 8/1997

OTHER PUBLICATIONS

Steven F. Boll, "Suppression of Acoustic Noise in Speech Using Spectral Subtraction," IEEE Transactions on Acoustics, Speech, and Signal Processing, vol. ASSP-27, No. 2, Apr. 1979, pp. 113-120.

R. L. Bouquin, Speech Communication, vol. 18, No. 1, XP-004008920, pps. 3-19, "Enhancement of Noisy Speech Signals: Application to Mobile Radio Communications," 1996.

B. L. Sim, et al., IEEE Transactions on Speech and Audio Processing, vol. 6, No. 4, XP-000785363, pps. 328-336, "A Parametric Formulation of the Generalized Spectral Subraction Method," Jul. 1, 1998.

* cited by examiner

*Primary Examiner*—Vivian Chin
*Assistant Examiner*—Justin Michalski
(74) *Attorney, Agent, or Firm*—Oblon, Spivak, McClelland, Maier & Neustadt, P.C.

(57) ABSTRACT

A noise suppressor device for attaining perceptually preferable noise suppression is disclosed. The device minimizes reduction in quality even in the presence of increased noises. The device is adaptable for use in voice communications systems and speech recognition systems employed in a variety of kinds of noisy environments. The device includes a spectrum subtracter and a spectrum amplitude suppressor that operate on the basis of perceptual weights.

48 Claims, 15 Drawing Sheets

NOISE SUPPRESSION DEVICE

BACKGROUND OF THE INVENTION

1. Field of the Invention

The present invention relates generally to noise suppression devices for reducing or suppressing noises other than objective signals in voice communications systems and speech recognition systems often used in various noisy environments.

2. Description of the Prior Art

Noise suppressor devices for suppressing any possible nonobjective signal components such as noises mixed into audio/voice signals are known in the art, one of which has been disclosed in, for example, Japanese Patent Laid-Open No. 212196/1997. The noise suppressor as taught by this Japanese publication is inherently designed to employ what is called the spectral subtraction method. This method is for noise reduction based on amplitude spectra in a way as suggested from Steven F. Boll, "Suppression of Acoustic Noise in Speech using Spectral Subtraction," IEEE Trans. ASSP, Vol. ASSP-27, No. 2, April 1979.

The prior known noise suppression technique of the above-identified Japanese Patent Laid-Open No. 212196/1997, will be explained in detail with reference to FIG. 1. In FIG. 1, reference numeral "200" designates such related art noise suppressor; 201 denotes a perceptual weighting side; and 202 indicates a loss control side. Numeral 101 denotes an input signal node; 102 is a frequency analyzer circuit; 103, linear prediction circuit; 104, auto-correlative analyzer circuit; 105, maximum value analyzer circuit. 106 designates an audio/non-audio analyzer circuit, an output of which is used for turn-on/off controlling of switches 107A, 107B. 108 is a noise spectrum characteristics calculation and storage circuit, which is for performing perceptual weighting processing. 109 is a subtractor means; 110 is an inverse frequency analyzer circuit for performing an adverse operation to that of the frequency analyzer circuit 102. 111 is an average noise level storage circuit; 112, loss control coefficient circuit; 113, output signal calculator circuit; 114, arithmetic means; 115, output signal node.

When an input signal is supplied to the input node 101 and taken into the noise suppressor 200, the frequency analyzer circuit 102 is rendered operative to convert a time domain or timebase signal into a frequency domain signal for separation into a power spectrum S(f) and phase spectrum P(f). Simultaneously, the input signal is subjected to linear prediction analyzation at the linear prediction analyzer circuit 103, thereby obtaining a linear prediction difference signal (error signal) from a difference between the input signal and a predicted value. This error signal is supplied to the auto-correlation analyzer circuit 104 to thereby obtain a self- or auto-correlation coefficient. The maximum value selector circuit 105 operates to search for the maximum value, Rmax, of such auto-correlation factor. The maximum value Rmax is then passed to the audio/nonaudio identifier circuit 106, which identifies the kind or type of the input signal. If the value Rmax is greater than a prespecified threshold value, then identify the signal as an audio signal; if the former is less than the latter then identify it as noise components.

The signal spectrum S(f) identified as noise at the audio/nonaudio identifier 106 is stored or accumulated as a noise spectrum Sns(f) in the noise spectrum characteristics calculation/storage circuit 108 in response to an operation of the switch 107A. Updating of the noise spectrum is carried out through multiplication of a weighting coefficient β to a noise spectrum $Sns_{old}$ before updating and the input signal spectrum S(f), in a way as defined by the following Equation (1):

$$Sns_{now}(f)=Sns_{old}(f)\cdot\beta+S(f)\cdot(1-\beta) \qquad (1)$$

Subsequently, for the purpose of noise suppression processing, a weighting factor W(f) is used for the noise spectrum Sns(f) to perform perceptual weighting. W(f) may be represented by Equation (2) below:

$$W(f)=\{B-(B/fc)f\}+K,\ f=0,\ldots fc \qquad (2)$$

In the equation above, "fc" is the value equivalent to the frequency band of an input signal, B and K are the weighting coefficients or factors, wherein the greater the value, the greater the amount of suppression. The values B, K are changeable or alterable depending on the kind and significance of noises.

The arithmetic means 109 performs subtraction processing of an average noise spectrum $S_{ns}(f)$ from the input signal spectrum S(f) in accordance with Equation (3), to be presented below, thereby obtaining a noise-removed spectrum S' (f). If the noise-removed spectrum S' (f) is negative then add thereto either zero (0) or low-level noise th(f).

[Eq. 3]

$$S'(f)=\begin{cases} S(f)-W(f)\cdot Sns(f) & \text{if } S(f)>Sns(f) \\ 0 \text{ or } th(f) & \text{else} \end{cases} \qquad (3)$$

The inverse frequency analyzer 110 makes use of the noise-removed spectrum S' (f) and phase spectrum P(f) to obtain a signal waveform through conversion from a frequency domain to a time domain.

Subsequently the average noise level storage circuit 111 stores therein a residual noise level at an instant that the input signal is determined as noise. The average noise level Lns will be updated only when the input signal is determined as noise by using Equation (4) to be later presented. Here, $Lns_{new}[t]$ is the average noise level updated at a time point t, $Lns_{old}$ is the average noise level within a frame prior to updating, Lns[t] is the residual noise level of an output signal of the inverse frequency analyzer 110 at a time point t, and β is the weighting factor.

$$Lns_{now}[t]=Lns_{old}\cdot\beta+LnS[t]\cdot(1-\beta) \qquad (4)$$

Using the values Lns[t] and $L_s[t]$ thus obtained, calculate a loss control coefficient A[t] by Equation (5) presented below. Here, μ is the loss amount. Ls[t] is a signal as output by the output signal calculator 113 in response to receipt of an output signal of the inverse frequency analyzer 110.

$$A[t]=Ls[t]/\mu Lns[t] \qquad (5)$$

The arithmetic circuit 114 multiplies the output signal of the inverse frequency analyzer 110 by the above obtained loss control coefficient A[t] to provide a resultant signal, which is output from the signal output node 115.

SUMMARY OF THE INVENTION

The noise suppressor stated above is capable of suppressing residual noises through execution of spectral subtraction processing after completion of the perceptual weighting relative to the average noise spectrum and further by use of the loss control coefficient, thereby making it possible to minimize distortion of intended signals and thus perceptually suppressing residual noises. Unfortunately, these advantages do not come without accompanying problems which follow.

As residual noises that could not have been removed away by spectral subtraction processing are subject to suppression processing on the time domain rather than on spectrum, any successful amplitude suppression will hardly be achievable on spectrum in a perceptually preferable way. Another problem faced with the related art is that in audio domains, it is impossible or at least greatly difficult to suppress residual noises without suppressing an audio signal waveform per se, which would disadvantageously result in a decrease in sound volume of audio and/or voice data.

Still another problem encountered with the related art lies in inherent limitations to the performance of noise suppression processing, which merely relies upon noise removal coefficient control schemes based on perceptual weighting of the average noise spectrum. This can be said because such related art approach is incapable of suppressing "special" noises that can occur in special environments. One example is that in highly noisy environments such as inside of a land vehicle that is running on express motorways or highways, the prediction accuracy of the average noise spectrum decreases due to degradation of noise domain determination accuracies, which results in creation of specific noises (called the "musical noises") due to excessive removal processing or the like, which is unique to the spectral subtraction methodology. Reduction or suppression of such musical noises will thus hardly be attainable by mere use of the related art removal coefficient control-based on-spectrum noise suppression processing.

A further problem faced with the related art lies in inability to suppress creation of sharp spectrum patterns which stand alone on the axis of frequency, which may be considered as one of the factors of musical noise creation, in low-level noises to be added during processing (fill-up process) in the event that the noise-removed spectrum becomes negative. It may be considered that the creation of such sharp spectrum patterns can badly behave to cause the musical noises discussed above.

This invention has been made in order to avoid the problems associated with the related art, and its primary object is to provide a new and improved noise suppression device capable of offering perceptually preferable noise suppressibility while at the same time reducing quality degradation even under high noisy environments.

A noise suppression device in accordance with this invention is specifically arranged so that it includes a time to frequency converter circuit for performing frequency analyzation of an input time domain signal for conversion to an amplitude spectrum, a circuit for obtaining a noise spectrum from the input signal, a circuit for obtaining a signal to noise ratio from the amplitude spectrum and the noise spectrum, a perceptual weight control circuit for controlling based on the signal to noise ratio first and second perceptual weights for use in performing perceptual weighting in accordance with spectra, a spectrum subtractor circuit for subtracting from said amplitude spectrum a product of said noise spectrum and the first perceptual weight as controlled by said perceptual weight control circuit, a spectrum amplitude suppressor circuit for multiplying a spectrum obtained from said spectrum subtractor circuit by the second perceptual weight as controlled by said perceptual weight control circuit, and a frequency to time converter circuit for converting an output of said spectrum suppressor circuit to a time domain signal.

The noise suppressor device may be arranged so that the perceptual weight control circuit is operable to let said first and second perceptual weights become larger at certain frequencies with increased signal to noise ratios while letting said first and second perceptual weights be smaller at frequencies with reduced signal to noise ratios.

The noise suppressor device may also be arranged to include a perceptual weight modifier circuit for modifying at least one of the first and second perceptual weights at a ratio of a high frequency power to a low frequency power of any one of an input signal amplitude spectrum and a noise spectrum as well as an average spectrum of the input signal amplitude spectrum and the noise spectrum.

A perceptual weight modifier circuit may also be provided for modifying the first and second perceptual weights based on a determination result as to whether an input signal is a noise or an audio component.

In addition, in cases where a subtraction result of said spectrum subtractor circuit is negative, fill-up processing may be executed to a spectrum obtained by multiplying a third perceptual weight to a specified spectrum.

Additionally, said the specified spectrum may be one of an input signal amplitude spectrum, a noise spectrum, and an average spectrum of the input signal amplitude spectrum and the noise spectrum.

Additionally the third perceptual weight is modified at a ratio of a high frequency power to a low frequency power of one of an input signal amplitude spectrum and a noise spectrum as well as an average spectrum of the input signal amplitude spectrum and the noise spectrum.

Alternatively, the third perceptual weight may be controlled depending on the signal to noise ratio.

Still alternatively, the third perceptual weight is adjusted in value through multiplication of a ratio of an input signal amplitude spectrum and a noise spectrum.

At least one perceptual weight is externally controlled or selected.

DETAILED DESCRIPTION OF THE PREFERRED EMBODIMENTS

Embodiment 1

An explanation will now be given of a noise suppression device incorporating the principles of this invention, with reference to the accompanying drawings.

Figure 2:
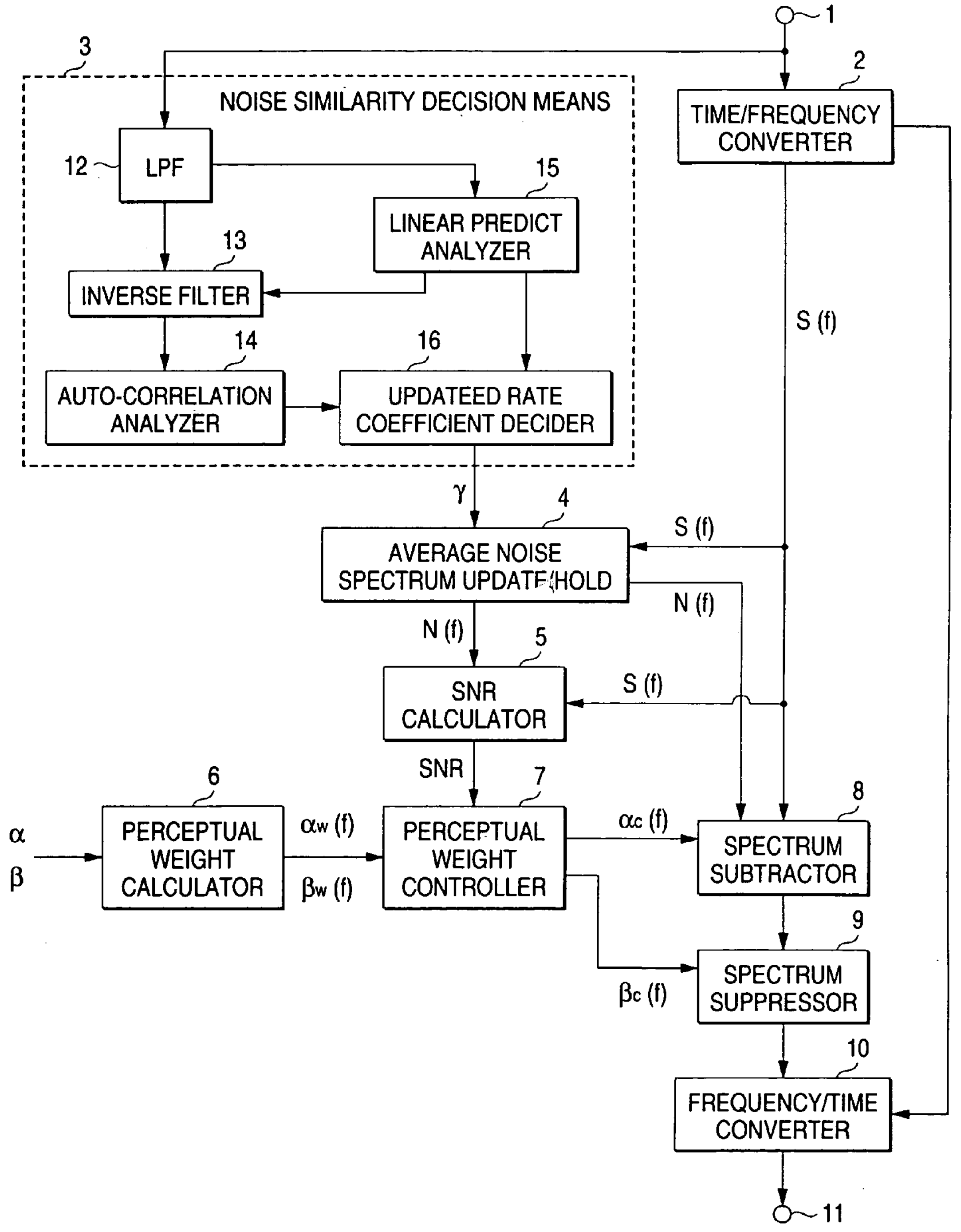
FIG. 2 is a block diagram showing a noise suppressor device in accordance with one embodiment of this invention.

FIG. 2 is a block diagram showing a configuration of a noise suppressor device in accordance with an embodiment 1 of the present invention. The illustrative noise suppressor is generally constituted from an input signal receive terminal 1, a time-to-frequency (time/frequency) converter circuit 2, a noise similarity analyzer circuit 3, an average noise spectrum update and storage circuit 4, a signal-to-noise ratio (SNR) calculator circuit 5, a perceptual weight calculator circuit 6, a perceptual weighting control circuit 7, a spectrum subtractor circuit 8, a spectrum suppressor circuit 9, a frequency/time converter circuit 10, and an output signal terminal 11. The principles of an operation of the noise suppressor embodying the present invention will be explained in conjunction with FIG. 2 below.

An input signal is input to the input signal terminal 1, which signal has been subjected to sampling at a specified frequency (for example, 8 kHz) and then subdivided into portions in units of certain frames (e.g. 20 ms). This input signal may be full of background noise components in some cases; in other cases, this signal may be an audio/voice signal with background noises partly mixed thereinto.

The time/frequency converter circuit 2 is a circuit for converting the input signal in such a way that a time domain or timebase signal is converted to a frequency domain signal. The time/frequency converter circuit 2 is operable to make use of, for example, 256-point fast Fourier transformation (F F T) techniques for converting the input signal into an amplitude spectrum S(f) and phase spectrum P(f). Note that the F F T techniques per se are well known in the art to which the invention pertains.

The noise similarity analyzer circuit 3 is generally configured from a linear prediction/analyze circuit 15, a low-pass filter (LPF) 12, an inverse filter 13, a self- or auto-correlation analyzer circuit 14, and an updated rate coefficient determination circuit 16. First, let the LPF 12 perform filtering processing of the input signal to obtain a low-pass filtered signal. This filter is 2 kHz in cut-off frequency thereof, by way of example. Performing the low-pass filtering processing makes it possible to remove away the influence of high frequency noise components, which in turn enables achievement of stable analyzation required.

The inverse filter 13 applies inverse filtering processing to the low-pass filter signal by use of a linear prediction coefficient or factor, thereby outputting a low-pass linear prediction residual signal (referred to as "low-pass difference" signal hereinafter). Subsequently the auto-correlation analyzer circuit 14 operates to perform auto-correlation analyzation of such low-pass difference signal to obtain a peak value positive in polarity, which is represented by $RAC_{max}$.

Figure 3:
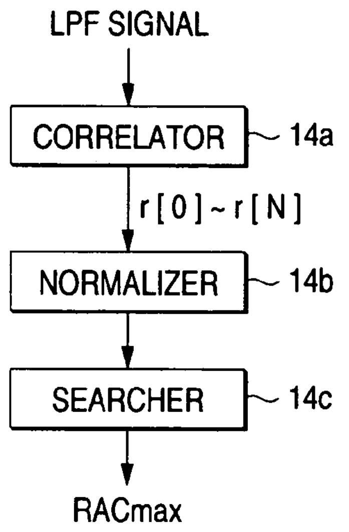
FIG. 3 is a detailed circuit diagram of an auto-correlation analyzer circuit 14 shown in FIG. 2.

A detailed configuration of the auto-correlation analyzer circuit 14 is shown in FIG. 3. This circuit includes a correlator **14*a* that performs within-frame auto-correlation computation of the low-pass filter signal to thereby obtain an auto-correlation series r[0] to r[N], where N is the length of a frame. Note that the auto-correlation series is subject to normalization at a normalizer 14*b*. Subsequently the normalized auto-correlation series is passed to a searcher 14*c*, which performs searching for a positive maximal value and then outputs the maximum value $RAC_{max}$ of the positive polarity. Next, let the linear prediction/analyze circuit 15** perform linear prediction analysis of the low-pass filter signal, thus obtaining a linear prediction coefficient (e.g. $\alpha$ parameter of 10-dimension).

An operation of the linear prediction/analyze circuit 15 is as follows. First, obtain the auto-correlation coefficient by auto-correlation analyzation of 10-dimension. Then, use this auto-correlation coefficient to obtain a reflection coefficient by the so-called "le roux" method, which in turn is used to obtain an a parameter that is a linear predictive coefficient. This procedure per se is well known among those skilled in the art. Additionally, when obtaining the linear predictive coefficient, a frame power and a linear predictive residual power of low-pass filter signal (low-pass difference power) are also obtained simultaneously.

The updated rate coefficient determination circuit 16 operates, for example, in such a way as to use the above-noted $RAC_{max}$ and also the frame power and the power of the low-pass residual signal to determine the noise similarity at five levels as shown in Table 1 below to thereby determine the average noise spectrum update rate coefficient r in accordance with each level.

TABLE 1

| Level | Noise Similarity | Average Noise Spectrum Update Rate Coefficient r |
|---|---|---|
| 0 | Great | 0.5 |
| 1 | " | 0.6 |
| 2 | " | 0.8 |
| 3 | " | 0.95 |
| 4 | Less | 0.9999 |

Figure 4:
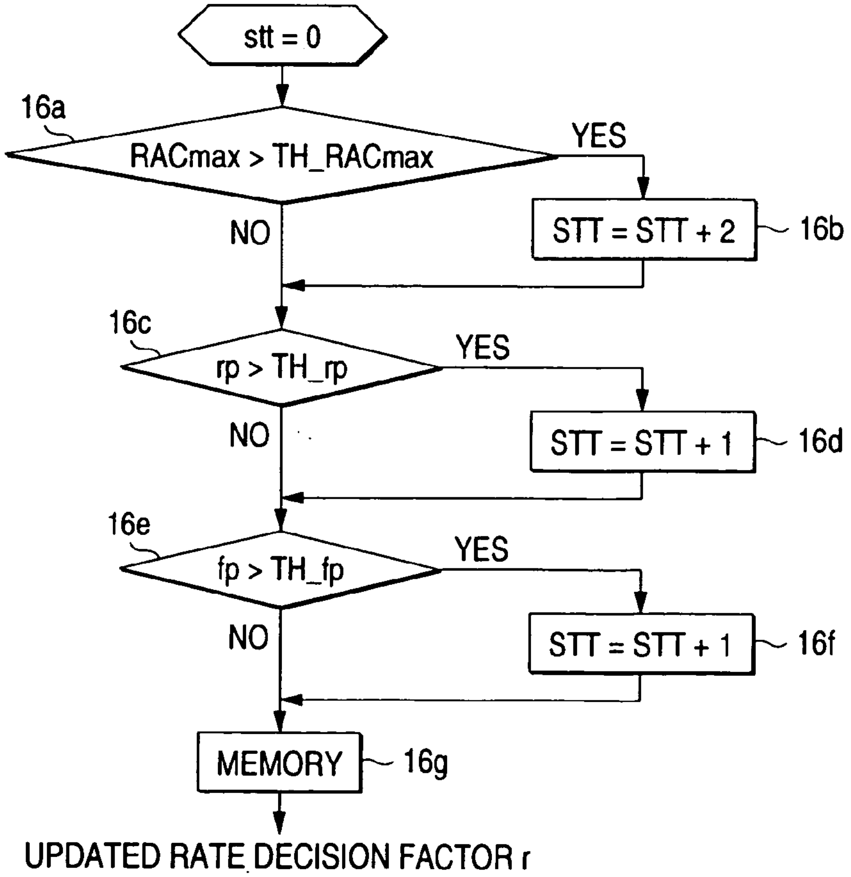
FIG. 4 is a detailed circuit diagram of an updated rate coefficient determinator circuit 16 of FIG. 2.

A practically implementable circuit is shown in FIG. 4. It has a status variable memory "stt", which is reset to 0 in the determination input pre-stage. Next, let a comparator 16*a* compare the low-pass residual auto-correlation coefficient maximum value $RAC_{max}$ to a predetermined threshold value $TH\_RAC_{max}$; when the former is greater than the latter, permit an adder 16*b* to count up the value of state variable stt by +2. Subsequently, at a comparator 16*c*, compare a low-pass residual power rp to a specified threshold value TH_rp; if the former is greater than the latter then cause an adder 16*d* to count up the value of state variable stt by +1. Next, let a comparator 16*e* compare a frame power fp to a certain threshold value TH_fp; if the former is greater than the latter then force an adder 16*f* to count up the value of state variable stt by +1. The content of the resultant state variable stt thus counted in this way will be output as a level toward a memory 16*g*. The memory 16*g* presently stores therein the average noise spectrum update rate coefficient r in accordance with the value of each level, and outputs an updated rate coefficient r in accordance with such level value.

The perceptual weight calculator circuit 6 inputs specified constant values α, α' (for example, α=1.2, α'=0.5) along with constant values β, β' (for instance, β=0.8, β'=0.1), and then calculates by Equation (6) a first perceptual weight αw(f) and second perceptual weight βw(f). fc is a Nyquist frequency(a half of sampling frequency).

$$\alpha w(f)=(\alpha'-\alpha)\cdot f/fc+\alpha,\ f=0, \ldots fc$$

$$\beta w(f)=(\beta'-\beta)\cdot f/fC+\beta,\ f=0, \ldots fc \tag{6}$$

Figure 5:
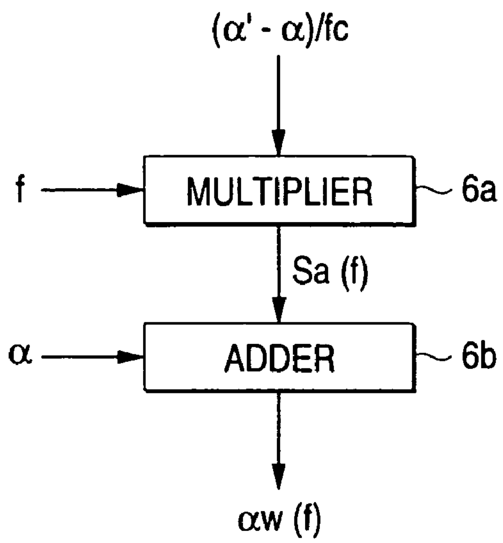
FIG. 5 is a detailed circuit diagram of a perceptual weight calculator circuit 6 of FIG. 2.

The perceptual weight calculator circuit 6 is shown in FIG. 5. This circuit includes a multiplier 6*a* that is operable to perform multiplication of a precalculated constant (α'−α)/fc and a frequency f. Subsequently, an adder 6*b* operates to add an output result of the multiplier 6*a* to a constant α, obtaining the first perceptual weight αw(f). This will be repeated up to a frequency band ranging from f to fc. With regard to the second perceptual weight βw(f) also, this may be obtained through similar processing to that of the first perceptual weight αw(f).

Figure 8:
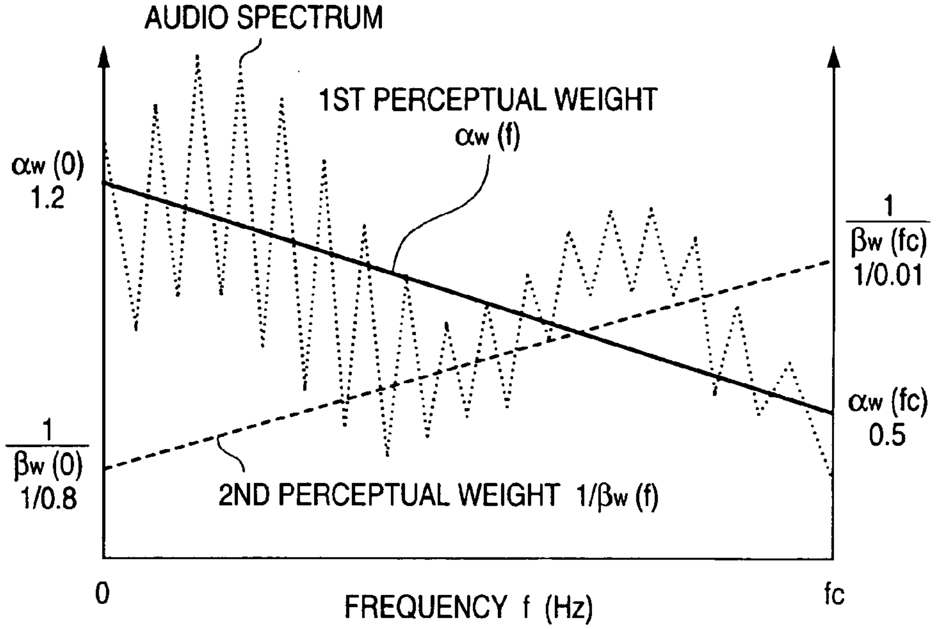
FIG. 8 is a diagram showing one example of a first perceptual weight $\alpha_w(f)$ and second perceptual weight $\beta_w(f)$ of this invention.

It should be noted that the first perceptual weight $\alpha_w$ and second perceptual weight $\beta_w$ are determinable depending on an input signal level and/or in-use environments. FIG. 8 shows one exemplary case where the use environment is inside of a land vehicle that is presently travelling on highways.

The average noise spectrum update and storage circuit 4 is operatively responsive to receipt of the amplitude spectrum S(f) and the average noise spectrum update rate coefficient r as output from the noise similarity analyzer 3, for performing updating of the average noise spectrum N(f) in a way defined by Equation (7) presented below. $N_{old}(f)$ is the average noise spectrum prior to such updating, and $N_{new}(f)$ is the average noise spectrum thus updated.

$$N_{new}(f)=(1-r)\cdot N_{old}(f)+r\cdot S(f) \tag{7}$$

Figure 6:
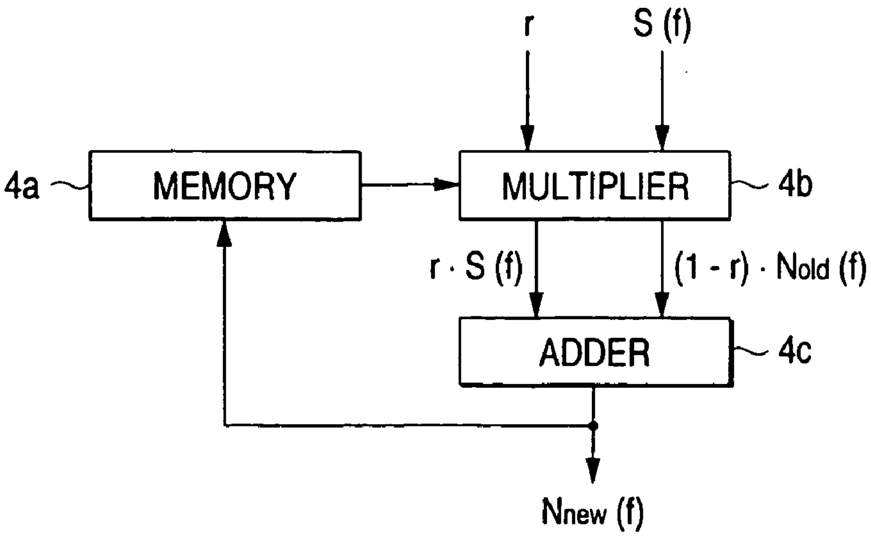
FIG. 6 is a detailed circuit diagram of an average noise spectrum updating and holding means 4 of FIG. 2.

A configuration of the average noise spectrum update and storage circuit 4 is shown in FIG. 6.

Firstly, at a multiplier 4*b*, execute multiplication of the update rate determination coefficient r and input signal spectrum S(f) together. Also perform multiplication of the "past" average noise spectrum Nold(f) that has been read out of a memory 4*a* and a specific value as obtained through subtraction of the update rate determination coefficient r from 1, i.e. 1−r, thus letting the result be output to an adder 4*c*. Subsequently, at an adder 4*c*, perform addition of two resultant values as output from said adder 4*b* to output a new average noise spectrum Nnew(f) while at the same time using the average noise spectrum Nnew(f) to update the content of the memory 4*a*.

The SN ratio calculator circuit 5 calculates from the input signal amplitude spectrum and average noise spectrum a ratio (SN ratio) of the input signal spectrum to the average noise spectrum.

Figure 7:
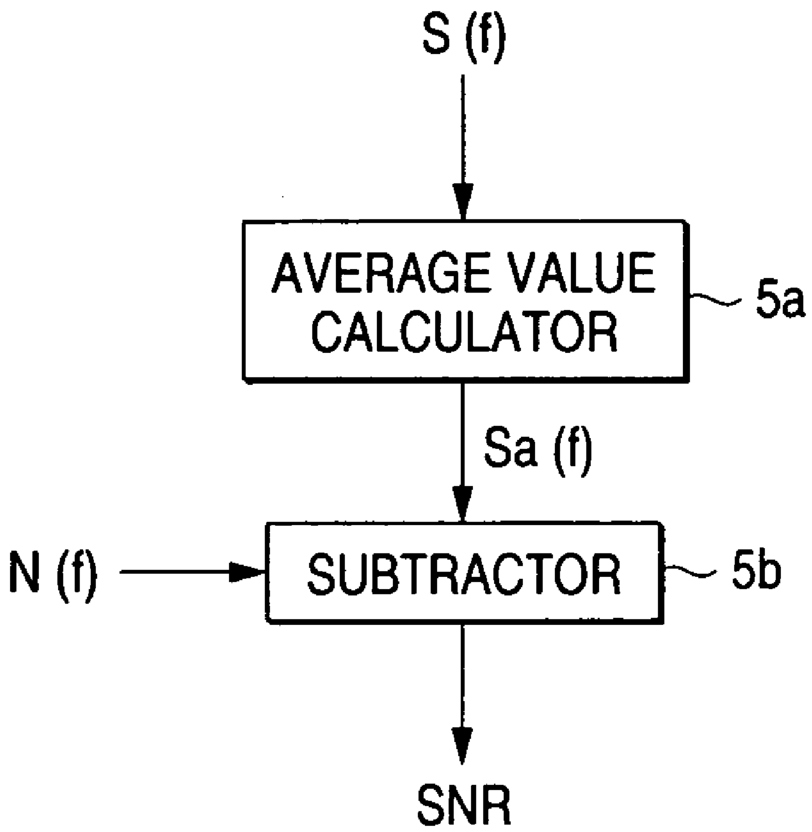
FIG. 7 is a detailed circuit diagram of a signal-to-noise (SN) ratio calculator circuit 5 of FIG. 2.

A configuration of the SN ratio calculator circuit is shown in FIG. 7. At an average value calculator 5*a*, calculate the average value of per-band spectrum components of the input signal spectrum S(f), and then output the average input signal spectrum Sa(f). The average input signal spectrum Sa(f) and the noise spectrum N(f) are converted into logarithmic value by the converter 5*b*.

Next, at a subtractor 5*c*, subtraction is done between log {S(f)} and log {N(f)} to thereby obtain a ratio (SNR) of the input signal spectrum Sa(f) to the average noise spectrum N(f), which ratio is then output to the perceptual weight calculation means 6.

Figure 9:
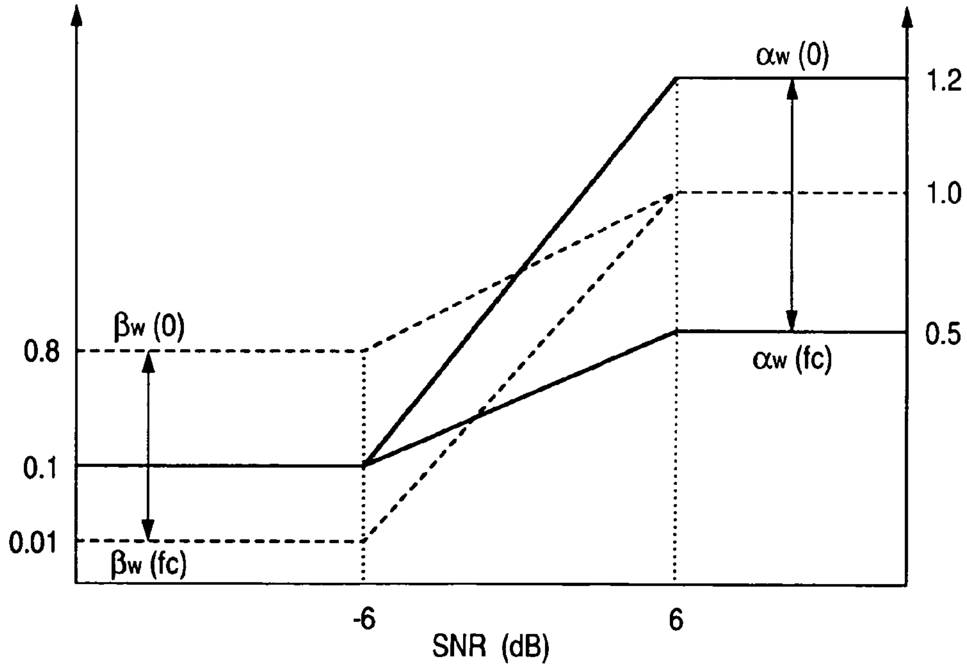
FIG. 9 shows one example of a control scheme of a perceptual weight control circuit of the noise suppressor embodying this invention, which scheme is for controlling the first perceptual weight $\alpha_w(f)$ and second perceptual weight $\beta_w$.

The perceptual weight control circuit 7 controls, on the basis of the SN ratio as output from the SN ratio calculator circuit 5, the first perceptual weight $\alpha_w(f)$ and the second perceptual weight $\beta_w(f)$ of FIG. 8 in such a way as to become appropriate values adapted to the SN ratio of a present frame. Thereafter, output them as an SN ratio-controlled first perceptual weight $\alpha_{wc}(f)$ and an SN ratio-controlled second perceptual weight $\beta_{wc}(f)$. FIG. 9 is one example of such control. When the SN ratio is high, set up a difference between $\alpha_w(0)$ and $\alpha_w(fc)$ so that it is great (namely, the gradient of $\alpha_w(f)$ in FIG. 8 gets larger). Adversely, in the case of $\beta_w(f)$, let a difference between $\beta_w(0)$ and $\beta_w(fc)$ become less (the gradient of $1/\beta_w(f)$ of FIG. 8 becomes moderate). And, as the SN ratio gets smaller, let a difference between $\alpha_w(0)$ and $\alpha_w(fc)$ becomes less (the gradient of $\alpha_w(f)$ is moderated); adversely, a difference between $\beta_w(0)$ and $\beta_w(fc)$ gets larger (the gradient of $1/\beta_w$ increases).

A practically implementable processing scheme is such that the perceptual weight control circuit 7 is responsive to receipt of the SN ratio of a present frame for performing control of the values of αc(f) and βc(f) in a way as given by the following equations:

$$\alpha c(f)=\begin{cases} 0.1 & SNR<-6\text{ dB} \\ \left\{\frac{(\alpha w(f)-0.1)}{12}\right\}\cdot SNR+\left\{\frac{(0.1+\alpha w(f))}{2}\right\} & -6\text{ dB}<SNR<6\text{ dB} \\ \alpha w(f) & SNR>6\text{ dB}\end{cases}$$

$$\beta c(f)=\begin{cases} \beta w(f) & SNR<-6\text{ dB} \\ \left\{\frac{(1.0-\beta w(f))}{12}\right\}\cdot SNR+\left\{\frac{(1.0+\beta w(f))}{2}\right\} & -6\text{ dB}<SNR<6\text{ dB} \\ 1.0 & SNR>6\text{ dB}\end{cases}$$

The spectrum subtractor circuit 8 multiplies the average noise spectrum N(f) by the SN ratio-controlled first perceptual weight $\alpha_c(f)$, executes subtraction of the amplitude spectrum S(f) in a way defined by Equation (8), and then outputs a noise-removed spectrum $S_s(f)$. In addition, when the noise-removed spectrum $S_s(f)$ is negative, insert zero or a prespecified low-level noise n(f), and then perform fill-up processing with this being as the noise-removed spectrum.

$$S(f)s = \begin{cases} S(f) - \alpha_c(f)\cdot N(f) & \text{if } S(f) > \alpha_c(f)\cdot N(f) \\ 0 \text{ or } n(f) & \text{else} \end{cases} \quad (8)$$

Figure 10:
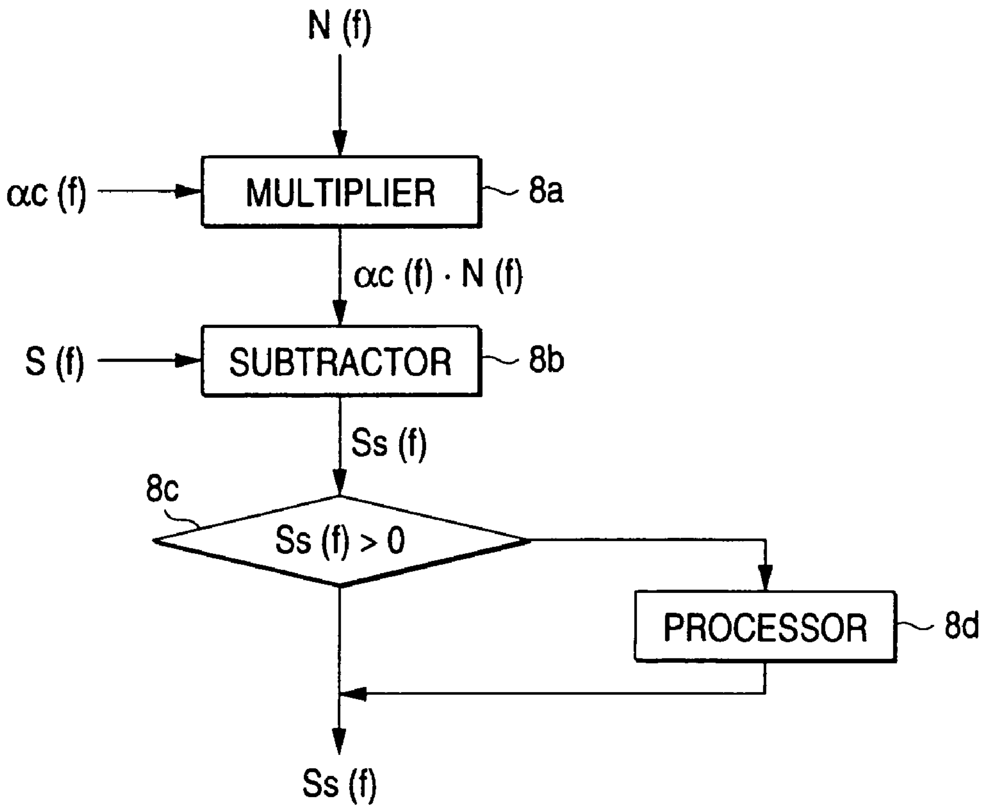
FIG. 10 is a detailed circuit diagram of a spectrum subtractor circuit 8 of FIG. 2.

A detail of the spectrum subtractor circuit 8 is shown in FIG. 10. At a multiplier 8*a*, multiply the average noise spectrum N(f) by the SN ratio-controlled first perceptual weight αc(f), and then output the result to a subtractor 8*b*. At a subtractor 8*b*, subtract the output result of the multiplier 8*a* from the input signal spectrum S(f) thereby obtaining the noise-removed spectrum Ss(f). Subsequently the noise-removed spectrum Ss(f) is input to a comparator 8*c*, which performs check/verifying of such sign. When the sign check result is negative, let the noise-removed spectrum Ss(f) be sent forth to a fill-up processor 8*d*, which executes fill-up processing for replacement it with 0 or a specified low-level noise n(f).

The spectrum suppression circuit 9 multiplies the noise-removed spectrum $S_s(f)$ by the SN ratio-controlled second perceptual weight $\beta_c(f)$ in a way as defined by Equation (9), thus outputting a noise-suppressed spectrum $S_r(f)$ with noises reduced in amplitude.

$$Sr(f) = \beta c(f)\cdot Ss(f) \quad (9)$$

The spectrum suppression circuit 9 has a multiplier which multiplies the noise-removed spectrum Ss(f) by the SN ratio-controlled second perceptual weight βc(f), performs spectrum amplitude suppression per frequency band f, and then outputs a noise-suppressed spectrum Sr(f).

The frequency/time converter circuit 10 operates in a reverse procedure to the time/frequency converter circuit 2; for example, it performs the inverse F F T processing for conversion to a time signal by using both the noise-suppressed spectrum $S_r(f)$ and the phase spectrum P(f), then partially performs overlapping or superimposing with signal components of a preceding frame, and outputs a noise-suppressed signal from the output signal terminal 11.

While varying depending on the shape of a noise spectrum, voiced sounds tend to be greater in low frequency components; thus, the low frequency region generally stays larger in SN ratio. In view of this, as shown in FIG. 8, letting the first perceptual weight $\alpha_w(f)$ for use in spectral subtraction be larger in low frequency region and decrease with an increase in frequency for approach to the high frequency makes greater the subtraction of noises at portions with increased SN ratios while making lower such noise subtraction at portions with less SN ratios; thus, it becomes possible to obtain totally great noise suppression amount while at the same time preventing excessive spectral subtraction—in particular, deformation of audio/voice spectra of high frequency components. This scheme will especially be effective for suppression of noise sounds occurring during travelling of land vehicles, which sounds have significant noise components in low frequency region.

In addition, as shown in FIG. 8, specific weighting is done in such a way as to let the second perceptual weight $\beta_w(f)$ for use in spectrum amplitude suppression increase (=weaken amplitude suppressibility) in the low frequency region with larger SN ratios while causing it to decrease (=enhance the amplitude suppressibility) with an increase in frequency for approach to the high frequency region with smaller SN ratios; accordingly, for audio/voice signals on which vehicle travel noise sounds having greater components in low frequency are superposed, the intended noise suppression is carried out by amplitude-suppressing residual noises in the high frequency which have failed to be removed away through spectral subtraction processing, thereby enabling successful achievement of noise suppression required.

Additionally, although in high noisy environments such as the interior of a land vehicle travelling at high speeds, the accuracy of prediction of the average noise spectrum tends to decrease because of a decrease in noise domain determination accuracy resulting in creation of musical noises unique to spectral subtraction methods due to effectuation of excessive noise-removal subtraction, the use of the arrangement of the present invention makes it possible to perform noise suppression in a way such that a higher order of priority is assigned to the amplitude suppression rather than the removal in higher frequency regions with reduced SN ratios as compared to low frequency consequently, it is possible to suppress generation of musical noises while simultaneously making it possible to suppress such generated musical noises per se, which leads to capability of achieving perceptually preferable noise suppressibilities.

Another advantage lies in the capability of preventing any excessive suppression because of the fact that the perceptual weight may act as a limiter even when SN-ratio calculation accuracy decreases, which in turn makes it possible to perform noise suppression that is less in audio/voice quality reduction.

Still another advantage of employment of the arrangement embodying the present invention is that residual noises may be suppressed without having to unintentionally suppress the audio spectrum in audio domains, to thereby ensure that audio/voice components will no longer decrease in sound volume.

Figure 1:
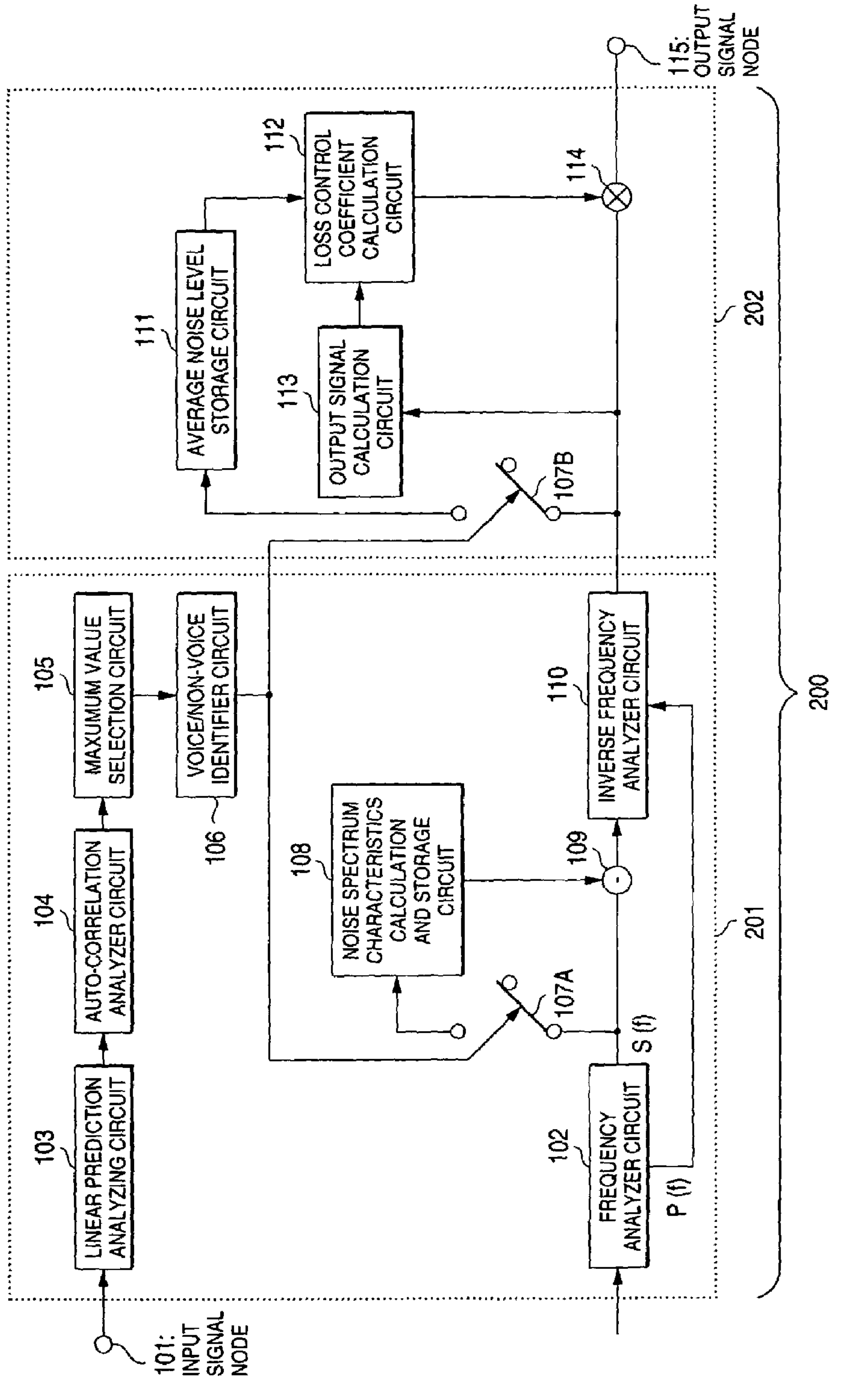
FIG. 1 PRIOR ART
FIG. 1 is a block diagram showing a configuration of one related art noise suppressor device.

It should be noted that the above-noted advantages of the present invention will also be attainable even when the noise similarity determination circuit 3 is replaced with audio/noise determination circuitry used in related art noise suppressor devices (such as the circuits 103–106 shown in FIG. 1).

Embodiment 2

Another implementable form of the embodiment 1 is available, which is arranged so that the average spectrum of a present frame's input signal amplitude spectrum and average noise spectrum is subdivided into portions corresponding to a low frequency region and high frequency region for obtaining a low frequency power and a high frequency power to determine a ratio of the low frequency power versus high frequency power, which ratio is then used to modify the first perceptual weight and the second perceptual weight.

Figure 11:
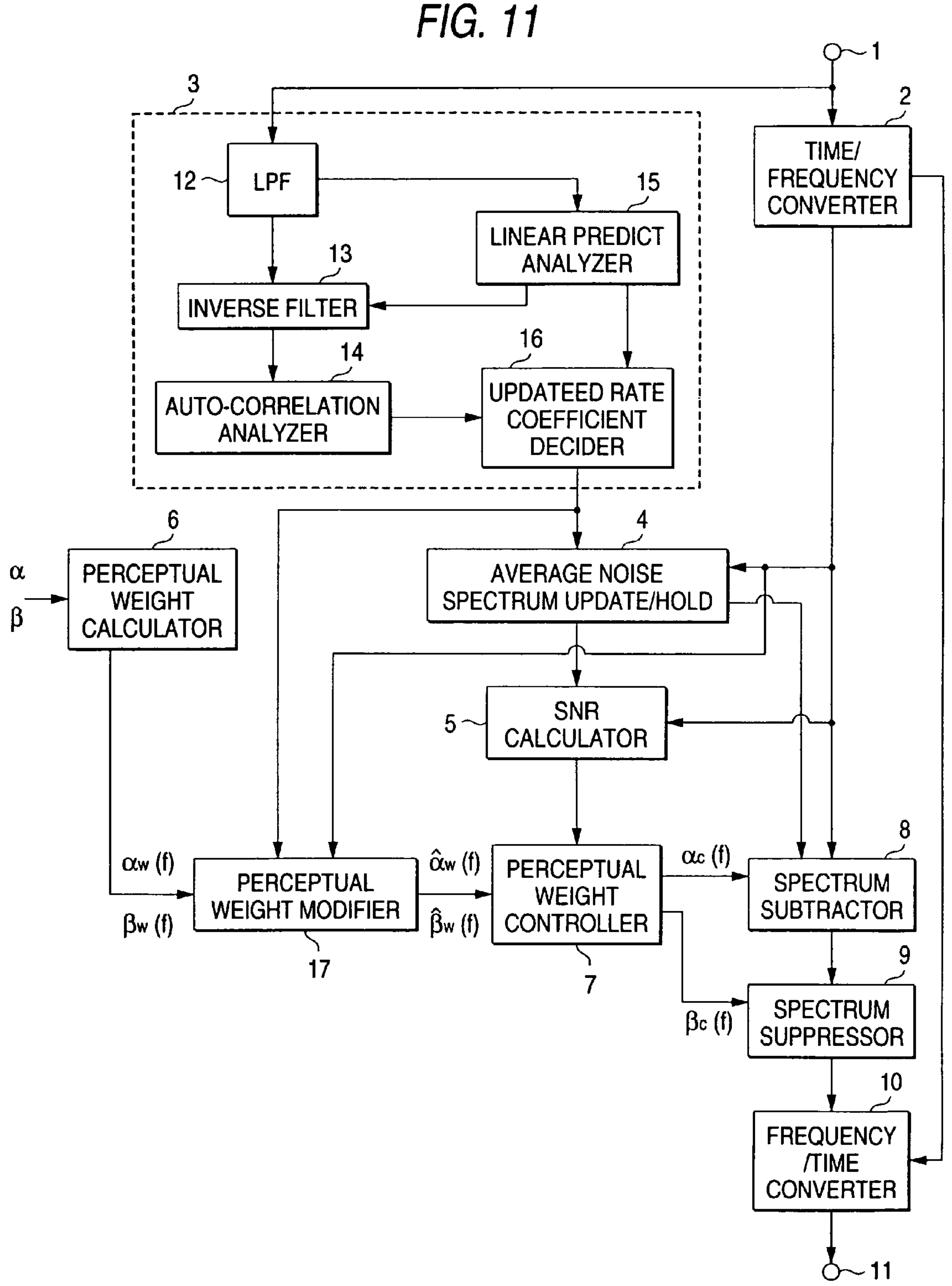
FIG. 11 is a block diagram showing a configuration of a noise suppressor in accordance with another embodiment of this invention.

FIG. 11 is a block diagram showing a configuration of a noise suppressor device in accordance with the embodiment 2 of the present invention, wherein the same or corresponding components to those of the embodiment 1 shown in FIG. 2 are designated by the same reference characters. One principal difference of the former over the latter is that a perceptual weight modifying circuit 17 is newly added. The remaining parts are the same as those of FIG. 1; thus, an explanation thereof is eliminated herein. An operation principle of the noise suppressor of this embodiment will be set forth in conjunction with FIG. 11 below.

The perceptual weight modifier circuit 17 is operable to input a 128-point amplitude spectrum as output from the time/frequency converter circuit along with the average noise spectrum as output from the average noise spectrum update and hold circuit 4, obtain the average spectrum of such amplitude spectrum and the average noise spectrum, handle selected points of the average spectrum, e.g. point numbers 0 to 63, as the intended low frequency spectrum while regarding the remaining points 64 to 127 as high frequency region spectrum, calculate low frequency power Powl and high frequency power Powh from these spectra respectively, and then calculate a high frequency/low frequency power ratio Powh/Powl=Powh/1. Note here that when Powh/1 goes beyond 1.0, let it be limited to 1.0; when going below a minimal threshold value Powth, limit the ratio to Powth.

Figure 12:
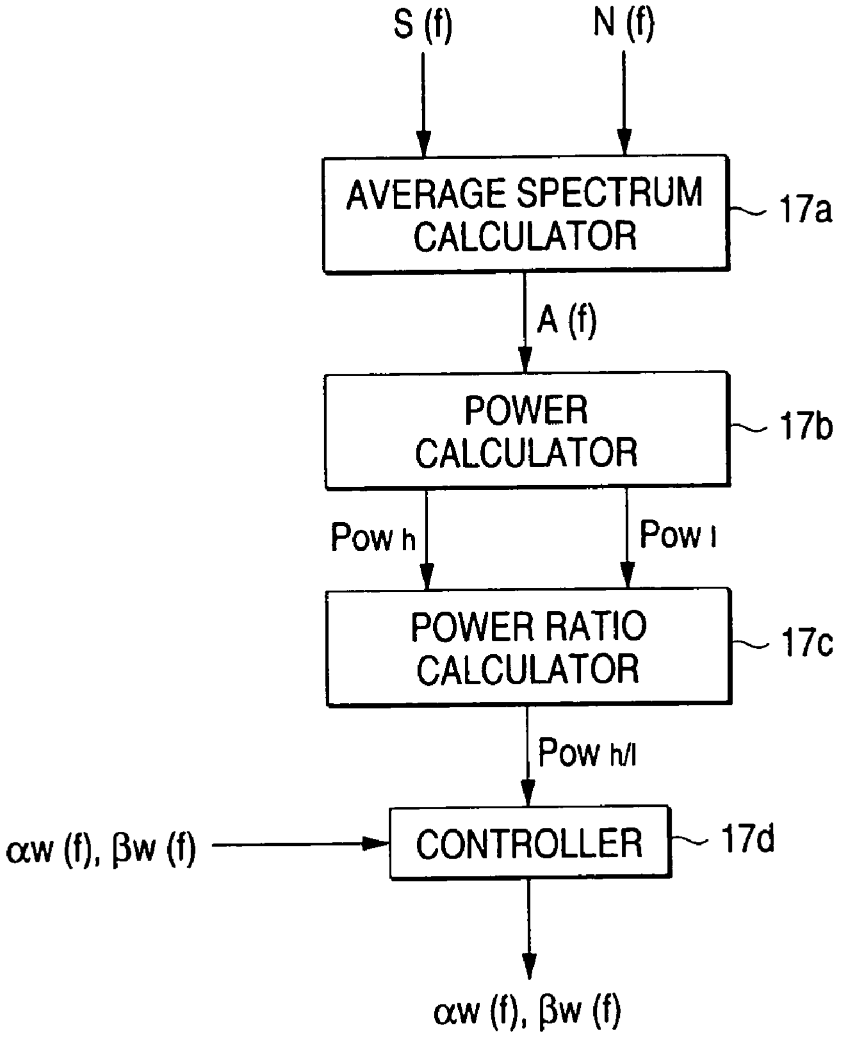
FIG. 12 is a detailed circuit diagram of a perceptual weight modifier circuit 17 of FIG. 11.

A detailed configuration of the perceptual weight modifier circuit 17 is shown in FIG. 12.

At an average spectrum calculator 17*a*, compute the average spectrum A(f) of an input signal spectrum and average noise spectrum. Next, for the resultant average spectrum A(f), obtain at a power calculator 17*b* a low frequency power Powl in a range of from points 0 to 63 along with a high frequency power Powh covering from points 64 to 127. Subsequently, at a power ratio calculator 17*c*, calculate a high frequency/low frequency power ratio Powh/Powl=Powh/1 from said low frequency power Powl and high frequency power Powh. Note here that when Powh/1 becomes greater than 1.0, let it be limited to 1.0; when less than the minimal threshold value Pow_th, limit the ratio to Pow_th.

Subsequently, at a controller 17*d*, perform modification of more than one perceptual weight. For example, in case the first perceptual weight $\alpha_w(f)$ and second perceptual weight $\beta_w(f)$ are to be modified, multiply each of the perceptual weights $\alpha_w$, $\beta_w$ by the high frequency/low frequency power ratio Powh/1 in a way as defined by Equation (10) presented below, and then output the resulting modified perceptual weights $\beta_w(f)$ $\alpha_w(f)$ toward the perceptual weight control circuit 7.

$$\beta w(f)=\beta w(f)\cdot((Pow_{h/l}-1)\cdot f+fc)/fc,\ f=0,\ \ldots\ fc$$

$$\alpha w(f)=\alpha w(f)\cdot((Pow_{h/l}-1)\cdot f+fc)/fc,\ f=0,\ \ldots\ fc \qquad (10)$$

For instance, in cases where the ratio of the low frequency power versus high frequency power of the average spectrum of the input signal amplitude spectrum and average noise spectrum is less, in other words, when the low frequency power is greater than the high frequency power, modify the first perceptual weight and second perceptual weight so that the low frequency thereof is further raised up to make the gradient more sharp to thereby enable accomplishment of both the spectrum removal and the perceptual weighting of the spectrum amplitude suppression in a way pursuant to the frequency characteristics of an input signal and the averaged noise level thereof, which in turn makes it possible—for example, in the event that audio and noise domains are hardly distinguishable over each other under high noisy environments or else—to provide appropriate matching of the weight coefficient(s) in accordance with the general contour shape of the average spectrum of the input signal spectrum and average noise spectrum and also with its change or variation with time, thereby enabling effectuation of further perceptually preferable noise suppression.

Although in the above embodiment both the first perceptual weight $\alpha_w(f)$ and the second perceptual weight $\beta_w(f)$ are modified, either one of the first perceptual weight $\alpha_w(f)$ and second perceptual weight $\beta_w(f)$ may be subject to such modification.

Embodiment 3

Another form of the embodiment 2 is available when reduction to practice of this invention, which is arranged so that the perceptual weight modifier circuit 17 is designed to obtain, as the alternative of the average spectrum of the input signal amplitude spectrum and average noise spectrum, a low frequency power and high frequency power after subdivision of the input signal spectrum alone into its low frequency region and high frequency region, and then modify the first perceptual weight and second perceptual weight at a ratio of such low frequency power versus high frequency power.

As the modification of the first perceptual weight and second perceptual weight at the ratio of the low frequency power and high frequency power of an input signal amplitude spectrum makes it possible to attain the intended perceptual weighting of the spectrum removal and spectrum amplitude suppression in accordance with the frequency characteristics of an input audio spectrum; accordingly, it becomes possible for example to perform weight matching in a way pursuant to the general contour shape of input signal amplitude spectrum and also its change with time, thereby enabling the noise suppression amount to increase especially in voiced sound domains, which leads to ability to perform perceptually preferable noise suppression.

Although in the above embodiment both the first perceptual weight $\alpha_w(f)$ and the second perceptual weight $\beta_w(f)$ are modified, either one of the first perceptual weight $\alpha_w(f)$ and second perceptual weight $\beta_w(f)$ may be subject to such modification.

Embodiment 4

The embodiment 1 may also be alterable so that the perceptual weight modifier circuit 17 is arranged to obtain, as the alternative of the input signal amplitude spectrum, a low frequency power and high frequency power after having subdivided the average noise spectrum into its low frequency region and high frequency region, and then change or modify the first perceptual weight and second perceptual weight at a ratio of such low frequency power versus high frequency power.

As the modification of the first perceptual weight and second perceptual weight at the ratio of the low frequency power and high frequency power of the average noise spectrum makes it possible to achieve the intended perceptual weighting of the spectrum removal and spectrum amplitude suppression in accordance with the frequency characteristics of such average noise spectrum; thus, it becomes possible for example to perform successful weight matching in accordance with the general contour shape of the average noise spectrum while keeping track of its change or variation with time even under high noisy environments, thereby enabling the noise suppression amount to increase especially in "noise frames", which in turn makes it possible to perform perceptually preferable noise suppression.

Although in the above embodiment both the first perceptual weight $\alpha_w(f)$ and the second perceptual weight $\beta_w(f)$ are modified, either one of the first perceptual weight $\alpha_w(f)$ and second perceptual weight $\beta_w(f)$ may be subject to such modification.

Embodiment 5

The embodiment 1 is further modifiable in arrangement in a way such that the perceptual weight modifier circuit 17 is designed to use a noise similarity determination result as output from the noise similarity determination circuit 3 to increase only the first perceptual weight shown in FIG. 8 and also moderate the gradient to thereby cause it to match the noise spectrum in the event that determination of a noise domain is done by way of example while in "audio frames" modifying the weight to match the gradient of an audio spectrum. Additionally, in regard to the second perceptual weight, this may be arranged to be significant in weight to increase the gradient in the case of "noise frames" while letting the weight be small to reduce or moderate the gradient in "audio/voice frames".

Since the modification of the first perceptual weight and second perceptual weight by use of a determination result as output from the noise similarity determination circuit makes it possible to attain the intended perceptual weighting of the spectrum removal and spectrum amplitude suppression in accordance with a noise level; thus, it becomes possible for example to change the weight between "noise frames" and "audio/voice frames", which in turn enables achievement of further perceptually preferable noise suppression.

Embodiment 6

At the spectral subtraction circuit 8, it will also be possible that perceptual weighting in the frequency direction is applied to certain low-level noises for use in fill-up processing in cases where the after-the-removal spectrum is negative or zero.

Figure 13:
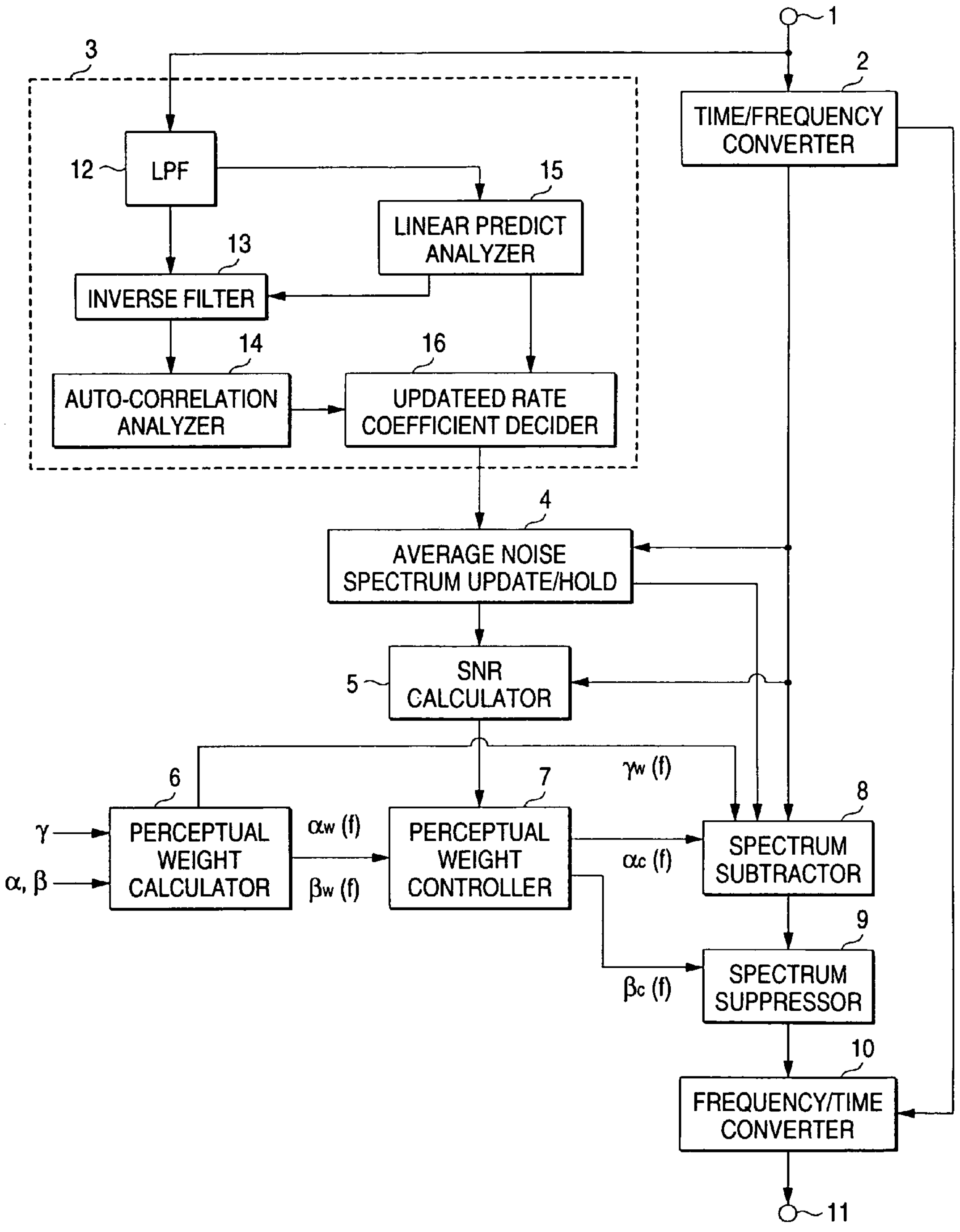
FIG. 13 is a block diagram showing a configuration of a noise suppressor in accordance with still another embodiment of this invention.

FIG. 13 is a block diagram showing an arrangement of a noise suppressor in accordance with an embodiment 6 of the present invention, wherein the same or corresponding components to those of the embodiment 1 of FIG. 2 are denoted by the same reference characters. An explanation as to the parts similar to those of FIG. 2 is eliminated herein. An operation principle of the noise suppressor of this embodiment will be explained with reference to FIG. 13 below.

A perceptual weight calculator circuit 6 shown herein is operable to input specified constants γ, γ' (for example, γ=0.25, γ'=0.4) and then calculates a third perceptual weight $\gamma_w(f)$ in a way as defined by Equation (11) below, where fc is the Nyquist frequency.

$$\gamma w(f)=(\gamma'-\gamma)\cdot f/fc+\gamma,\ f=0\ \ldots\ fc \tag{11}$$

A spectrum subtractor circuit 8 operates to multiply an average noise spectrum N(f) by an SN-ratio controlled first perceptual weight $\alpha_c(f)$, and executes subtraction of an amplitude spectrum S(f) in a way given by Equation (12) below, and then outputs a noise-removed spectrum $S_s(f)$. Additionally, in case the noise-removed spectrum $S_s(f)$ is negative or zero, perform fill-up processing for insertion of spectrum components as obtained through multiplication of the third perceptual weight $\gamma_w(f)$ to low-level noise n(f).

$$S(f)s=\begin{cases} S(f)-\alpha_c(f)\cdot N(f) & \text{if } S(f)>\alpha_c(f)\cdot N(f) \\ \gamma w(f)\cdot n(f) & \text{else} \end{cases} \tag{12}$$

Figure 14:
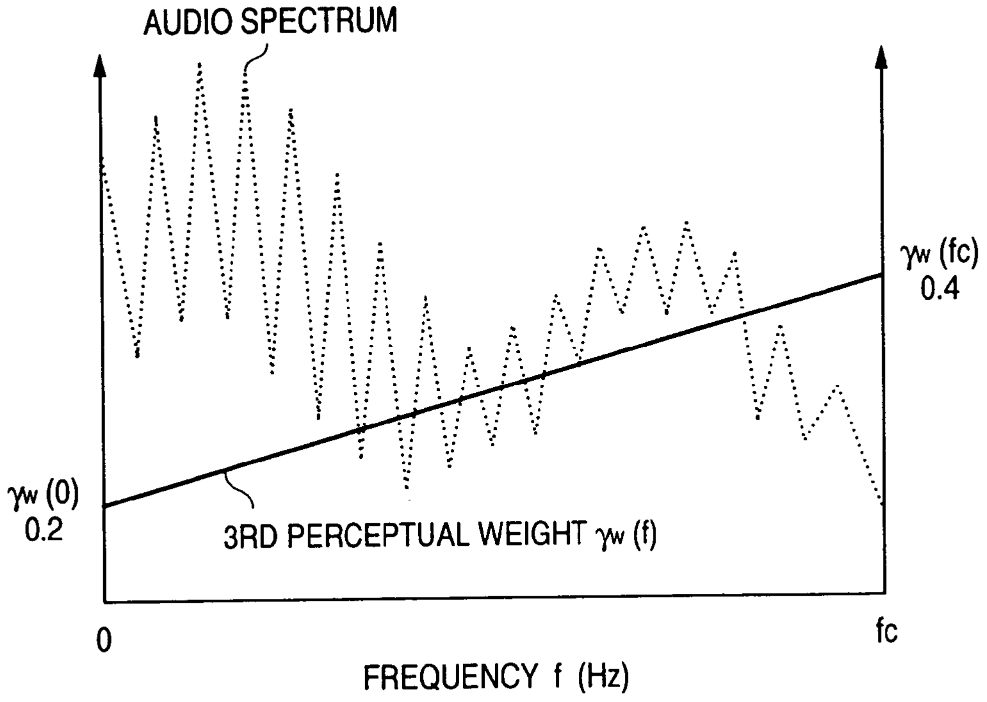
FIG. 14 shows one example of a third perceptual weight $\gamma_w(f)$ of this invention.
Figure 15A:
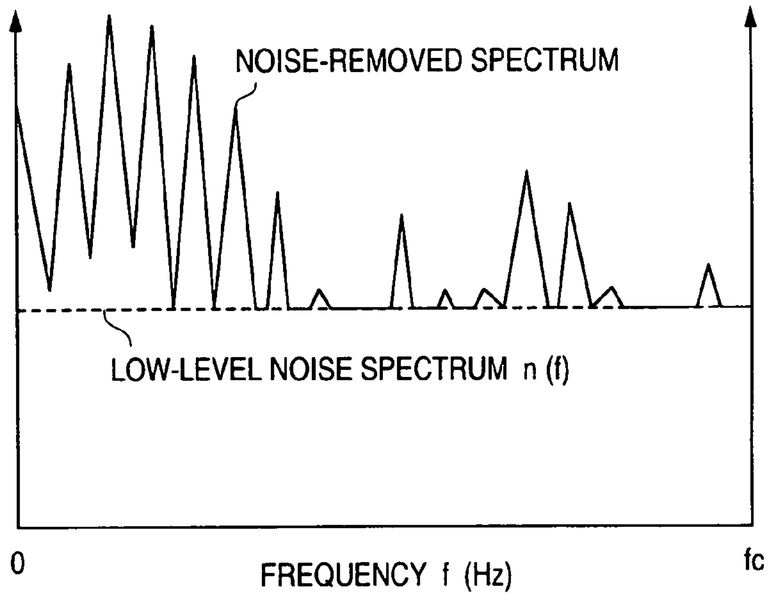
FIG. 15 shows one exemplary spectrum obtainable after noise removal processing in the case (a) of preventing perceptual weighting relative to a low-level noise n(f) spectrum being filled up when the resultant noise-removed spectrum is negative in the noise suppressor embodying this invention, along with another exemplary noise-removed spectrum in the case (b) of performing the perceptual weighting therein.
Figure 15B:
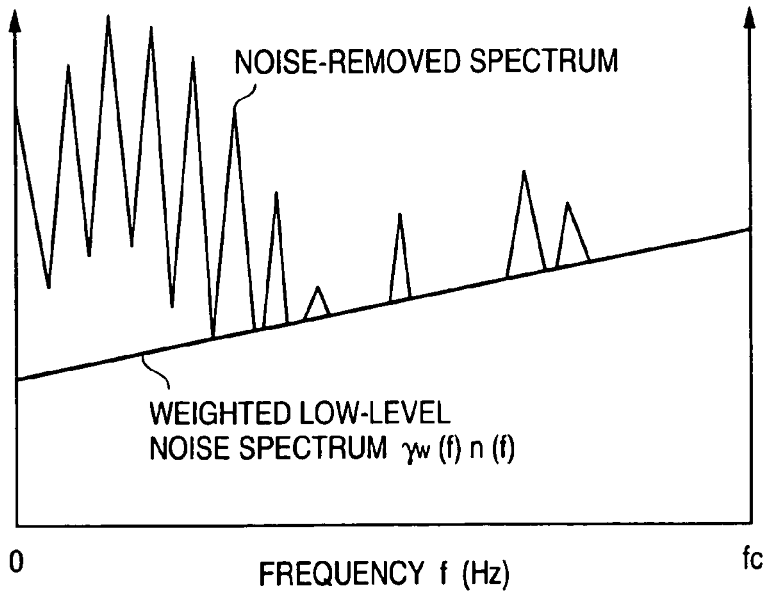

In the same way as the first perceptual weight $\alpha_w(f)$ and second perceptual weight $\beta_w(f)$, the third perceptual weight $\gamma_w(f)$ is also determinable depending on in-use environments or the like. FIG. 14 shows one example of the third perceptual weight $\gamma_w(f)$. FIG. 15(*a*) is one exemplary noise-removed spectrum in the event that low-level noises n(f) are not subject to perceptual weighting processing whereas FIG. 15(*b*) is an exemplary noise-removed spectrum in case such weighing is applied thereto. As apparent from viewing FIGS. 15A–15B, increasing the amplitude level of low-level noises to be filled up with an increase in frequency for approach to the high frequency permits a level difference between residual spectrum components after completion of removal processing and actually filled-up spectrum components to decrease in the high frequency region; thus, it becomes possible to suppress creation of sharp spectrum standing alone on the frequency domain, which may be considered as one of the factors of musical noise creation.

As shown in FIG. 14, as it is possible by applying perceptual weighting to specified spectrum for use in fill-up processing to suppress generation of a sharp spectrum standing alone on the frequency domain, which is considered as one of musical noise creation factors, it is possible to perform perceptually preferable noise suppression.

Embodiment 7

Another form of the embodiment 6 is available, which is arranged so that the spectral subtractor circuit 8 is modified to employ the average spectrum of an input signal amplitude spectrum and average noise spectrum in the alternative of the specified low-level noises used for the fill-up processing.

Applying perceptual weighting to the average spectrum of an input signal amplitude spectrum and average noise spectrum for use in fill-up processing makes it possible, in cases where "voice and noise frames" are hardly distinguishable over each other under high noisy environments for example, to cause residual noise spectrum to resemble the average spectrum component of the input signal amplitude spectrum and noise spectrum, in addition to the suppressibility of creation of a sharp spectrum standing alone on the frequency domain, which is considered as one of musical noise creation factors; thus, it is possible to perform further perceptually preferable noise suppression.

Embodiment 8

Another form of the embodiment 7 is possible, which is arranged so that the spectrum subtractor circuit 8 is modified to make use of an input signal amplitude spectrum rather than the specified low-level noises used for the fill-up processing.

Applying perceptual weighting to the input signal amplitude spectrum for use in fill-up processing makes it possible, in "audio/voice frames" for example, to force residual noise spectrum to resemble such input signal spectrum, in addition to the suppressibility of creation of a sharp spectrum standing alone on the frequency domain, which is considered as one of the musical noise creation factors; thus, it is possible to prevent undesired spectrum deformation to thereby enable achievement of further perceptually preferable noise suppression.

Embodiment 9

As another form of the embodiment 8, it will also be able to replace the specified low-level noises used for fill-up processing with the average noise spectrum.

Applying perceptual weighting to the average noise spectrum for use in fill-up processing makes it possible, in "noise frames" for example, to force residual noise spectrum to resemble the average noise spectrum, in addition to the suppressibility of creation of a sharp spectrum standing alone on the frequency domain, which is considered as one of musical noise creation factors; thus, it is possible to prevent undesired spectrum deformation thereby enabling achievement of further perceptually preferable noise suppression.

Embodiment 10

Another form of the embodiment 2 is available, which is arranged so that the average spectrum of an input signal amplitude spectrum and average noise spectrum is subdivided into portions corresponding to its low frequency region and high frequency region to thereby obtain a low frequency power and high frequency power for modification of the third perceptual weight at a ratio of the low frequency power and the high frequency power, in the same way as in the first perceptual weight and second perceptual weight.

Figure 16:
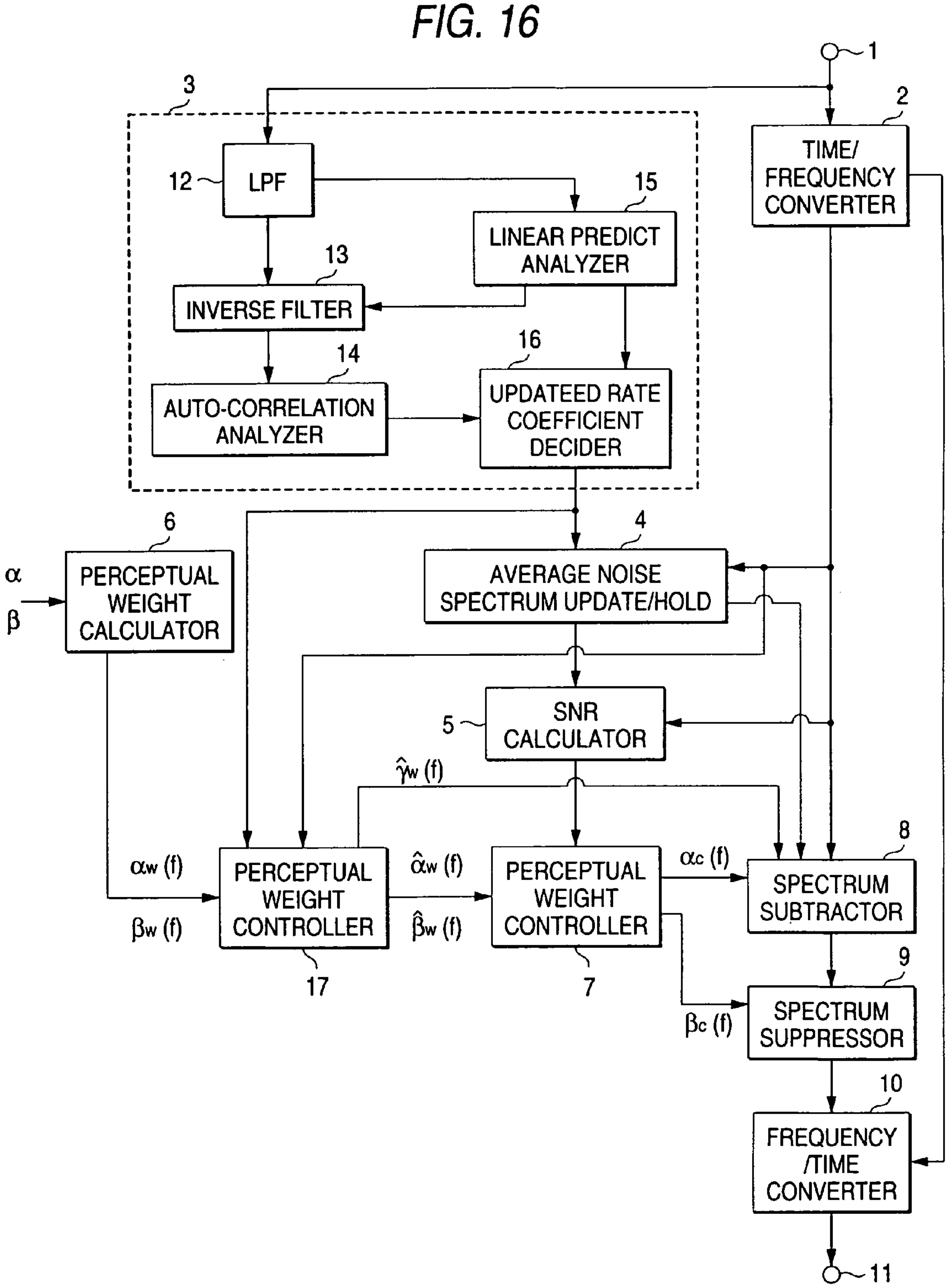
FIG. 16 is a block diagram showing a configuration of a noise suppressor in accordance with yet another embodiment of this invention.

FIG. 16 is a block diagram showing a configuration of a noise suppressor in accordance with an embodiment 10 of the present invention, wherein the same or corresponding components to those of the embodiment 2 of FIG. 11 are denoted by the same reference characters. An explanation on the components similar to those of FIG. 11 is eliminated herein. An operation principle of the noise suppressor of this embodiment will be explained with reference to FIG. 16 below.

The perceptual weight modifier circuit 17 is operable to input a 128-point amplitude spectrum as output from the time/frequency converter circuit 2 along with the average noise spectrum as output from the average noise spectrum update and hold circuit 4, obtain the average spectrum of such amplitude spectrum and the average noise spectrum, handle selected points of the average spectrum, e.g. point numbers 0 to 63, as the intended low frequency spectrum while regarding the remaining points 64 to 127 as high frequency region spectrum, calculate low frequency power Powl and high frequency power Powh from these spectra respectively, and then calculate a high frequency/low frequency power ratio Powh/Powl=Powh/1. Note here that when Powh/1 goes beyond 1.0, let it be limited to 1.0; when going below a minimal threshold value Powth, limit the ratio to Powth.

Subsequently, as in Equation (13) below, multiply the third perceptual weight $\gamma_w(f)$ by the high frequency/low frequency power ratio Powh/1, thereby outputting a modified third perceptual weight $\gamma_w(f)$ to the spectrum subtractor circuit.

$$\gamma w(f)=\gamma w(f)\cdot((Pow_{h/l}-1)\cdot f+fc)/fc,\ f=0,\ \ldots\ fc \tag{13}$$

Modifying the third perceptual weight at the ratio of low frequency power versus high frequency power of the average spectrum of an input signal amplitude spectrum and average noise spectrum makes it possible to apply to a specified spectrum for use in fill-up processing the intended perceptual weighting in a way that keeps track of a variation in frequency characteristics of such input signal spectrum and average noise spectrum; accordingly, in cases where audio/noise domain distinguishing or "differentiation" is eliminated for example, it is possible to permit residual noise spectrum to match the general contour shape of the average spectrum of an input signal spectrum and average noise spectrum and also its change or variation with time, thereby enabling suppression of musical noise creation, which leads to an ability to perform further perceptually preferable noise suppression.

Embodiment 11

Another form of the embodiment 10 is available which may be arranged so that in the alternative of the average spectrum of an input signal amplitude spectrum and average noise spectrum, the input signal amplitude spectrum is subdivided into portions corresponding to its low frequency region and high frequency region to obtain a low frequency power and high frequency power, thereby modifying the third perceptual weight at a ratio of the low frequency power and the high frequency power.

Modifying the third perceptual weight at the ratio of low frequency power to high frequency power of the input signal amplitude spectrum makes it possible to perform the intended perceptual weighting relative to a specified spectrum for use in fill-up processing while keeping track of variations of the frequency characteristics of an input audio signal; thus, it becomes possible, in "audio/voice frames" for example, to cause residual noise spectrum to match the general contour shape of such input signal spectrum and also its change with time, whereby any possible musical noise creation may be suppressed thus making it possible to perform further perceptually preferable noise suppression.

Embodiment 12

Another form of the embodiment 11 is available which may be arranged so that in the alternative of the input signal amplitude spectrum, the average noise spectrum is divided into portions corresponding to its low frequency region and high frequency region to obtain a low frequency power and high frequency power, thereby modifying the third perceptual weight at a ratio of the low frequency power versus the high frequency power.

Modifying the third perceptual weight at the ratio of the low frequency power to high frequency power of the average noise spectrum makes it possible to perform the intended perceptual weighting relative to a specified spectrum for use in fill-up processing while keeping track of variations of the frequency characteristics of an average noise signal; thus, it is possible, in "noise frames" for example, to force residual noise spectrum to match the general contour shape of the average noise spectrum and also its change with time, thereby enabling suppression of musical noise creation, which leads to an ability to perform further perceptually preferable noise suppression.

Embodiment 13

Another form of the embodiment 6 is available, which is designed so that the third perceptual weight is controlled based on an SN ratio as output from the SN ratio calculator circuit 5 in the same way as that in the first perceptual weight or the second perceptual weight.

Controlling the third perceptual weight by the SN ratio as output from the SN ratio calculator circuit makes it possible to execute the intended fill-up processing in a way pursuant to a noise level; accordingly, in the case of low frequency slant noises such as for example land vehicle travelling noises or else, the fill-up amount is made smaller in the low frequency in which the SN ratio tends to be significant in value while increasing the fill-up amount with an increase in frequency toward the high frequency in which the SN ratio tends to remain less, thereby making it possible to increase the resultant noise suppression amount while at the same time preventing generation of stand-alone sharp spectrum components that are considered as one of the factors of musical noise creation, thus enabling achievement of further perceptually preferable noise suppression.

Embodiment 14

Another form of the embodiment 6 is available, which is arranged so that the third perceptual weight is adjustable in value through multiplication of the ratio of an input signal amplitude spectrum and average noise spectrum to the third perceptual weight.

Figure 17:
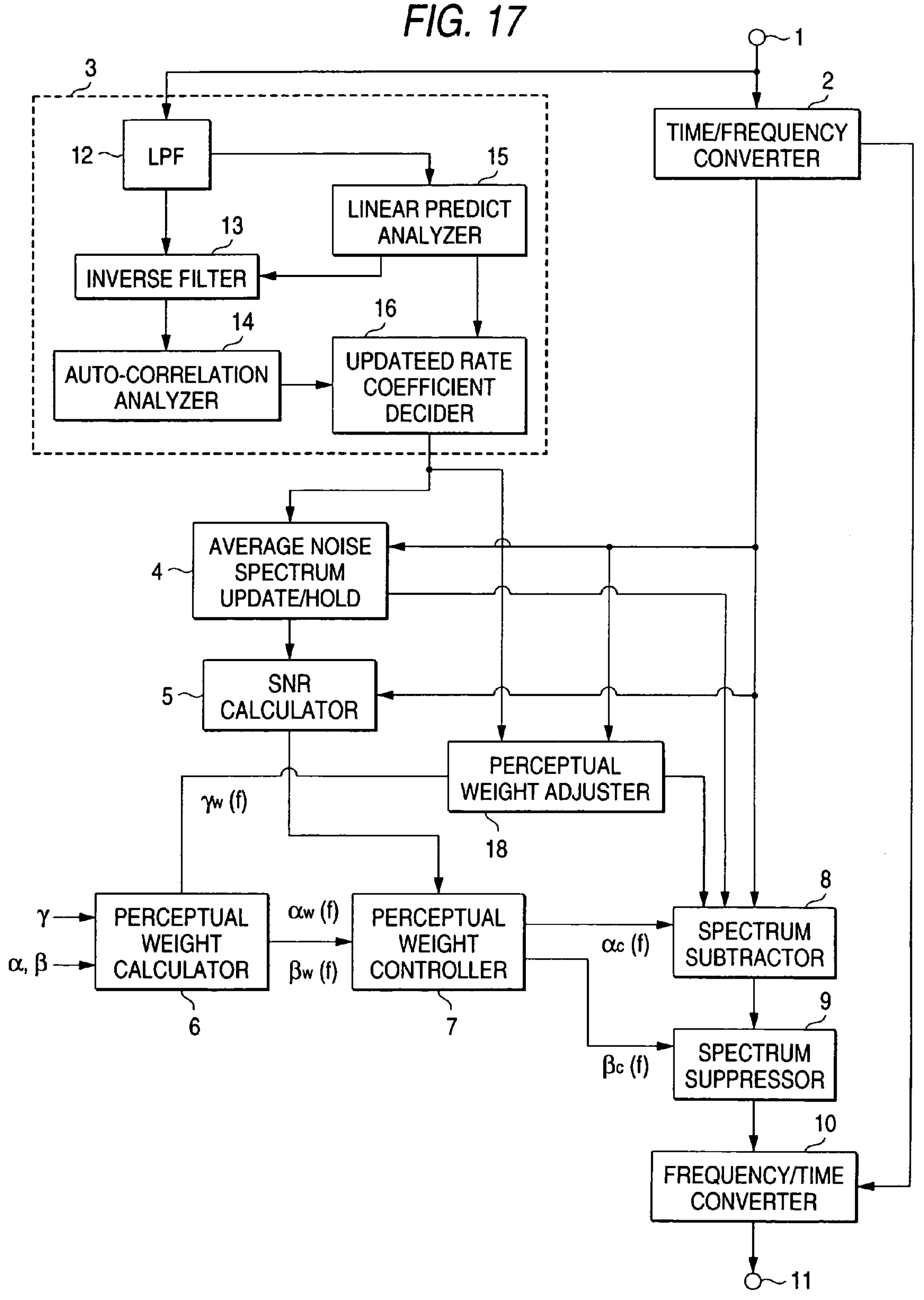
FIG. 17 is a block diagram showing a configuration of a noise suppressor in accordance with a further embodiment of this invention.

FIG. 17 is a block diagram showing a configuration of a noise suppressor in accordance with an embodiment 14 of the present invention, wherein the same or corresponding components to those of the embodiment 6 of FIG. 13 are designated by the same reference characters. A difference of the former over the latter is that a perceptual weight adjustment circuit 18 is newly added. As the remaining parts are the same as those of FIG. 13, an explanation thereof are eliminated herein. An operation principle of the noise suppressor of this embodiment will be explained in conjunction with FIG. 17 below.

The perceptual weight adjuster circuit 18 is operable to multiply the third perceptual weight $\gamma_w(f)$ by the ratio of an input signal amplitude spectrum S(f) and average noise spectrum N(f) in a way as defined in Equation (14), thereby outputting the result as an adjusted third perceptual weight $\gamma_a$ toward the spectrum subtractor circuit 8.

$$\gamma(f)a = \begin{cases} \gamma w(f)\cdot S(f)/N(f)) & \text{if } S(f) < N(f) \\ \gamma w(f) & \text{else} \end{cases} \tag{14}$$

Figure 18:
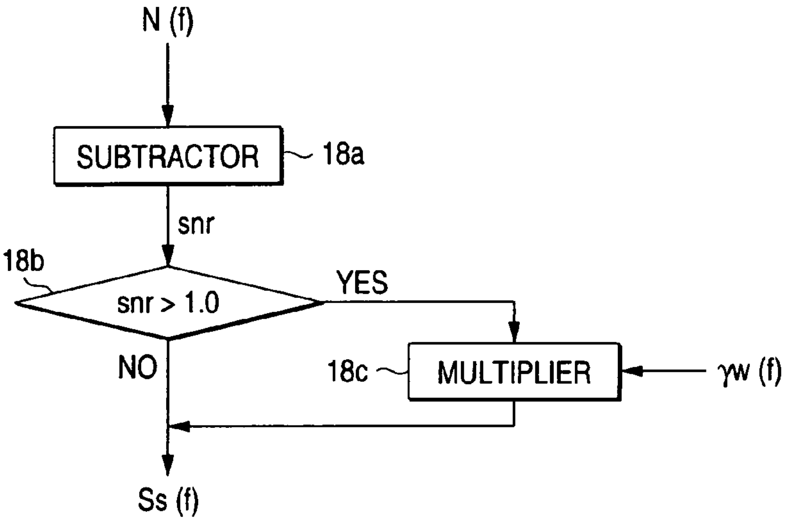
FIG. 18 is a detailed circuit diagram of a perceptual weight adjuster circuit 18 of FIG. 17.

A detailed configuration of the perceptual weight adjuster circuit 18 is shown in FIG. 18.

A practical processing routine is as follows. First, at a subtractor 18*a*, calculate a ratio of an input signal amplitude spectrum S(f) and average noise spectrum N(f), which ratio is represented by "snr." The ratio snr thus obtained is supplied to a comparator 18*b* for large/small comparison of the value thereof. When a comparison result is greater than 1.0, i.e., if S(f)>N(f), then permit a multiplier 18*c* to multiply the third perceptual weight γw(f) by the ratio snr of the input signal amplitude spectrum S(f) to average noise spectrum N(f) thus calculating an adjusted third perceptual weight γa(f). Additionally, if the comparison result of the comparator 18*b* is less than 1.0 then directly output as the adjusted third perceptual weight γa(f) the third perceptual weight γw(f) without performing multiplication of snr.

Adjusting the value of the third perceptual weight by multiplication of the ratio of input signal amplitude spectrum and average noise spectrum makes it possible to smoothen those spectrum components used for the fill-up processing in the direction of frequency; thus, it becomes possible to reduce the factor of creation of musical noises that have been considered to occur due to the presence of stand-alone sharp spectrum components, thereby enabling achievement of further perceptually preferable noise suppression.

Embodiment 15

Additionally, still another form of the embodiment 1 is available which is designed so that at least one perceptual weight may be either controlled or selected from the outside.

Figure 19:
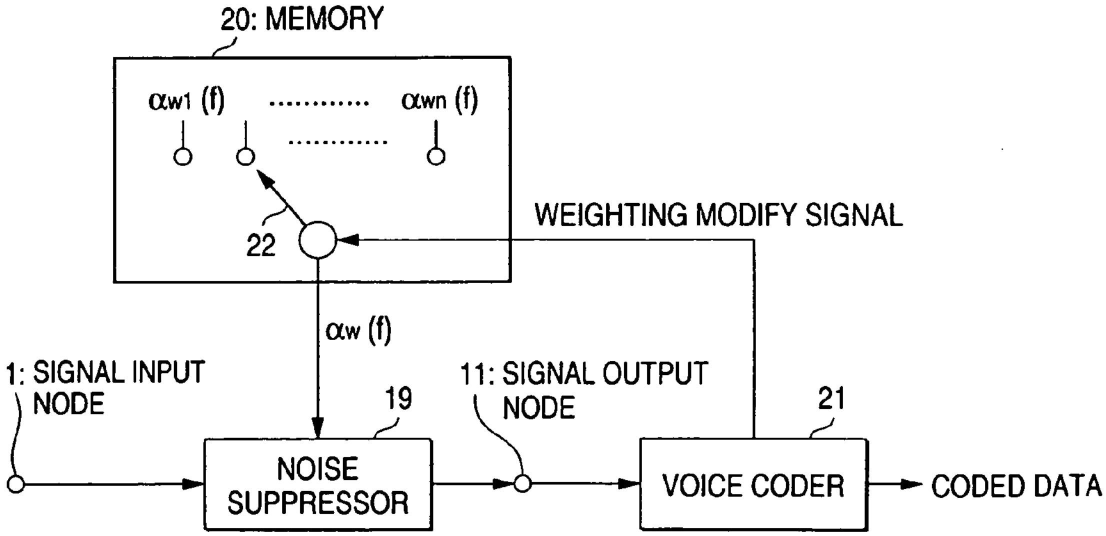
FIG. 19 is a block diagram showing a configuration of a noise suppressor in accordance with a still further embodiment of the invention.

FIG. 19 is a block diagram showing part of a configuration of a noise suppressor in accordance with an embodiment 15 of the present invention. This embodiment is such that the perceptual weight calculator circuit 6 shown in FIG. 2 is replaced with a memory 20 and an audio/voice encoder device 21 of FIG. 10. A noise suppressor 19 is similar to the noise suppressor of FIG. 2 with the perceptual weight calculator circuit 6 being deleted therefrom. An operation principle of the perceptual weight calculator circuit of this embodiment will be explained with reference to FIG. 19.

While letting the memory 20 store therein a plurality of first perceptual weights $\alpha_{w1}(f), \ldots, \alpha_{wn}(f)$ by way of example, select any desired one or ones from among them by a switch 22 provided outside of the noise suppressor in accordance with a weight modify signal as output from the audio/voice encoder 21. One example is that this weight modify signal is cooperative with either a transfer rate modify signal or an encoder circuit modify signal in cases where the audio/voice encoding scheme of the audio/voice encoder 21 is based on variable rate encoding techniques with the transfer rate being variable depending on the audio/voice status or alternatively in the event that it contains a plurality of built-in audio/voice encoder circuits.

For instance, in case the audio/voice encoder 21 of FIG. 19 is designed to employ a variable rate encoding scheme, a higher order of priority is assigned to increasing the noise suppression amount rather than a demerit of spectrum deformabilities because of the fact that the noise representation ability in such audio/voice encoding scheme generally tends to decrease with a decrease in transfer rate. In view of this, when the transfer rate is low, select from those stored in the memory 20 a specific one that is significant in $\alpha_w(f)$ weight value (great in spectral subtraction degree). On the contrary, when the transfer rate is high with the noise representation ability being relatively high, reduce the noise suppression amount in order to suppress noises while preventing spectrum deformabilities—that is, select a specific one from those in memory 20, which is less in αw(f) weight value (small in spectral subtraction degree).

Externally controlling or selecting the first perceptual weight in this way makes it possible to perform perceptual weighting of spectrum removal which is matchable with the encoding characteristics of the audio/voice encoder device that is connected for example at the post stage of the noise suppressor of the present invention; consequently, when an audio/voice encoding scheme that is inherently poor in noise representation ability is selected for example, it becomes possible to increase the noise suppression amount accordingly, thereby enabling achievement of further perceptually preferable noise suppression.

What is claimed is:

1. A noise suppression device comprising:
   - a time to frequency converter configured to perform frequency analyzation of an input time domain signal for conversion to an amplitude spectrum;
   - a noise spectrum unit configured to obtain a noise spectrum of the input time domain signal;
   - a signal to noise calculator configured to obtain a signal to noise ratio from the amplitude spectrum and the noise spectrum;
   - a perceptual weight controller configured to control, based on the signal to noise ratio, first and second perceptual weights;
   - a spectrum subtracter configured to subtract from said amplitude spectrum a product of said noise spectrum and the first perceptual weight as controlled by said perceptual weight controller;
   - a spectrum amplitude suppressor configured to multiply a spectrum obtained from said spectrum subtracter by the second perceptual weight as controlled by said perceptual weight controller, the perceptual weight controller configured to control the second perceptual weight such that the amount of amplitude suppression by the spectrum amplitude suppressor decreases for at least a portion of the spectrum obtained from the spectrum subtracter as the signal-to-noise ratio increases; and a frequency to time converter configured to convert an output of said spectrum amplitude suppressor to a time domain signal.

2. The noise suppression device as recited in claim 1, wherein said perceptual weight controller is operable to let said first and second perceptual weights become larger at certain frequencies with increased signal to noise ratios while letting said first and second perceptual weights be smaller at frequencies with reduced signal to noise ratios.

3. The noise suppression device as recited in claim 1, further comprising: a perceptual weight modifier configured to modify at least one of the first and second perceptual weights at a ratio of a high frequency power to a low frequency power of any one of an input signal amplitude spectrum, a noise spectrum, and an average spectrum of the input signal amplitude spectrum and the noise spectrum.

4. The noise suppression device as recited in claim 1, further comprising: a perceptual weight modifier configured to modify the first and second perceptual weights based on a determination result as to whether an input signal is a noise or an audio component.

5. The noise suppression device as recited in claim 1, wherein the spectrum subtracter is further configured to perform fill-up processing, when a subtraction result of said spectrum subtracter is negative or zero, to a spectrum obtained by multiplying a third perceptual weight to a specified spectrum.

6. The noise suppression device as recited in claim 5, wherein said specified spectrum is one of an input signal amplitude spectrum, a noise spectrum, and an average spectrum of the input amplitude spectrum and the noise spectrum.

7. The noise suppression device as recited in claim 5, further comprising means for modifying the third perceptual weight at a ratio of a high frequency power to a low frequency power of at least one of an input signal amplitude spectrum, a noise spectrum, and an average spectrum of the input signal amplitude spectrum and the noise spectrum.

8. The noise suppression device as recited in claim 5, further comprising means for controlling the third perceptual weight based on the signal to noise ratio.

9. The noise suppression device as recited in claim 5, further comprising a perceptual weight adjuster configured to adjust the third perceptual weight in value through multiplication of a ratio of an input signal amplitude spectrum and an average noise spectrum.

10. The noise suppression device as recited in claim 1, wherein at least one perceptual weight is externally controlled or selected.

11. The noise suppression device as recited in claim 1, further comprising: a noise similarity analyzer configured to obtain a coefficient based on a noise similarity level of the input time domain signal, wherein the noise spectrum unit is further configured to obtain the noise spectrum based on the coefficient and the amplitude spectrum.

12. A method for noise suppression, comprising:

generating an amplitude spectrum from an input time domain signal;

generating a noise spectrum of the input time domain signal;

determining a signal to noise ratio from the amplitude spectrum and the noise spectrum;

controlling, based on the signal to noise ratio, a first perceptual weight and a second perceptual weight;

subtracting from the amplitude spectrum a product of the noise spectrum and the first perceptual weight controlled on the basis of the signal to noise ratio, to generate a noise-removed spectrum;

multiplying the noise-removed spectrum by the second perceptual weight controlled on the basis of the signal to noise ratio, to generate a noise-suppressed spectrum;

controlling the second perceptual weight such that an amount of noise suppression decreases for at least a portion of the noise-removed spectrum, as the signal-to-noise ratio increases; and converting the noise-suppressed spectrum to an output time domain signal.

13. The method as recited in claim 12, wherein the step of controlling comprises:

increasing the first perceptual weight and the second perceptual weight at frequencies with increased signal to noise ratios; and decreasing the first perceptual weight and the second perceptual weight at frequencies with reduced signal to noise ratios.

14. The method as recited in claim 12, further comprising: modifying at least one of the first perceptual weight and the second perceptual weight at a ratio of a high frequency power to a low frequency power of any one of an input signal amplitude spectrum, a noise spectrum, and an average spectrum of the input signal amplitude spectrum and the noise spectrum.

15. The method as recited in claim 12, further comprising: modifying the first perceptual weight and the second perceptual weight, based on a determination result as to whether an input signal is a noise component or an audio component.

16. The method as recited in claim 12, further comprising: performing fill-up processing, when a subtraction result of said spectrum subtracter is negative or zero, to a spectrum obtained by multiplying a third perceptual weight to a specified spectrum.

17. The method as recited in claim 16, wherein said specified spectrum is one of an input signal amplitude spectrum, a noise spectrum, and an average spectrum of the input amplitude spectrum and the noise spectrum.

18. The method as recited in claim 16, further comprising: modifying the third perceptual weight at a ratio of a high frequency power to a low frequency power of at least one of an input signal amplitude spectrum, a noise spectrum, and an average spectrum of the input signal amplitude spectrum and the noise spectrum.

19. The method as recited in claim 16, further comprising: controlling the third perceptual weight based on the signal to noise ratio.

20. The method as recited in claim 16, further comprising: adjusting the third perceptual weight in value through multiplication of a ratio of an input signal amplitude spectrum and an average noise spectrum.

21. The method as recited in claim 12, wherein the step of controlling comprises: externally selecting one of the first perceptual weight and the second perceptual weight.

22. The method as recited in claim 12, further comprising: determining a coefficient from a noise similarity level of the input time domain signal, wherein the step of generating the noise spectrum comprises: generating the noise spectrum based on the coefficient and the amplitude spectrum.

23. A noise suppression device comprising:

a time to frequency converter configured to perform frequency analyzation of an input time domain signal for conversion to an amplitude spectrum;

a circuit noise spectrum unit configured to obtain a noise spectrum of the input time domain signal;

signal to noise calculator configured to obtain a signal to noise ratio from the amplitude spectrum and the noise spectrum;

a perceptual weight controller configured to control, based on the signal to noise ratio, first and second perceptual weights;

means for subtracting from the amplitude spectrum a product of the noise spectrum and the first perceptual weight as controlled by the perceptual weight controller;

means for multiplying a spectrum obtained from the means for subtracting by the second perceptual weight as controlled by the perceptual weight controller, the perceptual weight controller configured to control the second perceptual weight such that an amount of amplitude suppression by the means for multiplying decreases for at least a portion of the spectrum obtained from the means for subtraction as the signal-to-noise ratio increases; and a frequency to time converter configured to convert an output of the means for multiplying to a time domain signal.

24. A noise-suppressed time domain signal generated by a noise suppression method comprising:

generating an amplitude spectrum from an input time domain signal;

generating a noise spectrum of the input time domain signal;

determining a signal to noise ratio from the amplitude spectrum and the noise spectrum;

controlling, based on the signal to noise ratio, a first perceptual weight and a second perceptual weight;

subtracting from the amplitude spectrum a product of the noise spectrum and the first perceptual weight controlled on the basis of the signal to noise ratio, to generate a noise-removed spectrum;

multiplying the noise-removed spectrum by the second perceptual weight controlled on the basis of the signal to noise ratio, to generate a noise-suppressed spectrum;

controlling the second perceptual weight such that an amount of noise suppression decreases for at least a portion of the noise-removed spectrum, as the signal-to-noise ratio increases; and converting the noise-suppressed spectrum to an output time domain signal.

25. A noise suppression device for suppressing noise other than an objective signal contained in an input signal, comprising:

means for controlling first and second perceptual weights for use in performing perceptual weighting, according to the input signal;

means for performing a spectral subtraction on a signal derived from a spectrum of said input signal, using said controlled first perceptual weight, and for performing a spectral amplitude suppression on an other signal derived from the spectrum of said input signal, using said controlled second perceptual weight, to produce a spectrally subtracted and amplitude suppressed signal; and means for controlling the second perceptual weight such that the amount of amplitude suppression decreases for at least a portion of the other signal derived from the spectrum of the input signal, as the signal-to-noise ratio increases.

26. The noise suppression device set forth in claim 25, further comprising:

means for controlling the first perceptual weight in such a way as to let the subtraction amount increase with increasing signal-to-noise ratio.

27. The noise suppression device set forth in 26, further comprising means for performing perceptual weighting with the first and second perceptual weights according to the frequency of the spectrum of the input signal.

28. The noise suppression device set forth in claim 25, further comprising means for performing perceptual weighting with the first perceptual weight according to a gradient in such a way as to let the subtraction amount decrease with increasing frequency of the spectrum of the input signal.

29. The noise suppression device set forth in claim 28, further comprising means for controlling the gradient of the first perceptual weight in such a way as to become steep with increasing signal-to-noise ratio.

30. The noise suppression device set forth in claim 25, further comprising means for performing perceptual weighting with the second perceptual weight according to a gradient in such a way as to let the amplitude suppression amount increase with increasing frequency of the spectrum of the input signal.

31. The noise suppression device set forth in claim 30, further comprising means for controlling the gradient of the second perceptual weight in such a way as to become moderate with increasing signal-to-noise ratio.

32. The noise suppression device set forth in claim 25, further comprising means for performing perceptual weighting with the first perceptual weight according to a gradient in such a way as to let the subtraction amount decrease with increasing frequency of the spectrum of the input signal; and means for performing perceptual weighting with the second perceptual weight according to a gradient in such a way as to let the amplitude suppression amount increase with increasing frequency of the spectrum of the input signal.

33. The noise suppression device set forth in claim 32, further comprising means for controlling the gradient of the first perceptual weight in such a way as to become steep with increasing signal-to-noise ratio; and further comprising means for controlling the gradient of the second perceptual weight in such a way as to become moderate with increasing signal-to-noise ratio.

34. The noise suppression device set forth in 25, further comprising means for performing perceptual weighting with the first and the second perceptual weights according to the frequency of the spectrum of the input signal.

35. A noise suppression method of suppressing noise other than an objective signal contained in an input signal, comprising the steps of:

controlling first and second perceptual weights for use in performing perceptual weighting, according to the input signal;

performing a spectral subtraction on a signal derived from a spectrum of said input signal, using said controlled first perceptual weight, and a spectral amplitude suppression on an other signal derived from the spectrum of said input signal, using said controlled second perceptual weight, to produce a spectrally subtracted and amplitude suppressed signal: and controlling the second perceptual weight such that the amount of amplitude suppression decreases for at least a portion of the other signal derived from the spectrum of the input signal, as the signal-to-noise ratio increases.

36. A noise suppression device for suppressing noise other than an objective signal contained in an input signal, comprising:

a perceptual weight controller configured to control first and second perceptual weights for use in performing perceptual weighting, according to the input signal;

a spectrum subtractor configured to perform a spectral subtraction on a signal derived from a spectrum of said input signal, using said controlled first perceptual weight; and a spectrum amplitude suppressor configured to perform a spectral amplitude suppression on an other signal derived from the spectrum of said input signal, using said controlled second perceptual weight, the perceptual weight controller configured to control the second perceptual weight such that the amount of amplitude suppression decreases for at least a portion of the other signal derived from the spectrum of the input signal, as the signal-to-noise ratio increases.

37. A noise suppression device comprising:

a time to frequency converter configured to perform frequency analyzation of an input time domain signal for conversion to an amplitude spectrum;

a noise spectrum unit configured to obtain a noise spectrum of the input time domain signal;

a signal to noise calculator configured to obtain a signal to noise ratio from the amplitude spectrum and the noise spectrum;

a perceptual weight controller configured to control, based on the signal to noise ratio, first and second perceptual weights;

a spectrum subtracter configured to subtract from said amplitude spectrum a product of said noise spectrum and the first perceptual weight as controlled by said perceptual weight controller;

a spectrum amplitude suppressor configured to multiply a spectrum obtained from said spectrum subtracter by the second perceptual weight as controlled by said perceptual weight controller, the perceptual weight controller configured to control the second perceptual weight such that the amount of amplitude suppression by the spectrum amplitude suppressor decreases for at least a portion of the spectrum obtained from the spectrum subtracter as the signal-to-noise ratio increases;

a frequency to time converter configured to convert an output of said spectrum amplitude suppressor to a time domain signal; and a perceptual weight modifier configured to modify at least one of the first and second perceptual weights at a ratio of a high frequency power to a low frequency power of any one of an input signal amplitude spectrum, a noise spectrum, and an average spectrum of the input signal amplitude spectrum and the noise spectrum.

38. A noise suppression device comprising:

a time to frequency converter configured to perform frequency analyzation of an input time domain signal for conversion to an amplitude spectrum;

a noise spectrum unit configured to obtain a noise spectrum of the input time domain signal;

a signal to noise calculator configured to obtain a signal to noise ratio from the amplitude spectrum and the noise spectrum;

a perceptual weight controller configured to control, based on the signal to noise ratio, first and second perceptual weights;

a spectrum subtracter configured to subtract from said amplitude spectrum a product of said noise spectrum and the first perceptual weight as controlled by said perceptual weight controller;

a spectrum amplitude suppressor configured to multiply a spectrum obtained from said spectrum subtracter by the second perceptual weight as controlled by said perceptual weight controller, the perceptual weight controller configured to control the second perceptual weight such that the amount of amplitude suppression by the spectrum amplitude suppressor decreases for at least a portion of the spectrum obtained from the spectrum subtracter as the signal-to-noise ratio increases;

a frequency to time converter configured to convert an output of said spectrum amplitude suppressor to a time domain signal, wherein the spectrum subtracter is further configured to perform fill-up processing, when a subtraction result of said spectrum subtracter is negative or zero, to a spectrum obtained by multiplying a third perceptual weight to a specified spectrum; and means for modifying the third perceptual weight at a ratio of a high frequency power to a low frequency power of at least one of an input signal amplitude spectrum, a noise spectrum, and an average spectrum of the input signal amplitude spectrum and the noise spectrum.

39. A noise suppression device comprising:

a time to frequency converter configured to perform frequency analyzation of an input time domain signal for conversion to an amplitude spectrum;

a noise spectrum unit configured to obtain a noise spectrum of the input time domain signal;

a signal to noise calculator configured to obtain a signal to noise ratio from the amplitude spectrum and the noise spectrum;

a perceptual weight controller configured to control, based on the signal to noise ratio, first and second perceptual weights;

a spectrum subtracter configured to subtract from said amplitude spectrum a product of said noise spectrum and the first perceptual weight as controlled by said perceptual weight controller;

a spectrum amplitude suppressor configured to multiply a spectrum obtained from said spectrum subtracter by the second perceptual weight as controlled by said perceptual weight controller, the perceptual weight controller configured to control the second perceptual weight such that the amount of amplitude suppression by the spectrum amplitude suppressor decreases for at least a portion of the spectrum obtained from the spectrum subtracter as the signal-to-noise ratio increases;

a frequency to time converter configured to convert an output of said spectrum amplitude suppressor to a time domain signal, wherein the spectrum subtracter is further configured to perform fill-up processing, when a subtraction result of said spectrum subtracter is negative or zero, to a spectrum obtained by multiplying a third perceptual weight to a specified spectrum; and means for controlling the third perceptual weight based on the signal to noise ratio.

40. A noise suppression device comprising:

a time to frequency converter configured to perform frequency analyzation of an input time domain signal for conversion to an amplitude spectrum;

a noise spectrum unit configured to obtain a noise spectrum of the input time domain signal;

a signal to noise calculator configured to obtain a signal to noise ratio from the amplitude spectrum and the noise spectrum;

a perceptual weight controller configured to control, based on the signal to noise ratio, first and second perceptual weights;

a spectrum subtracter configured to subtract from said amplitude spectrum a product of said noise spectrum and the first perceptual weight as controlled by said perceptual weight controller;

a spectrum amplitude suppressor configured to multiply a spectrum obtained from said spectrum subtracter by the second perceptual weight as controlled by said perceptual weight controller, the perceptual weight controller configured to control the second perceptual weight such that the amount of amplitude suppression by the spectrum amplitude suppressor decreases for at least a portion of the spectrum obtained from the spectrum subtracter as the signal-to-noise ratio increases;

a frequency to time converter configured to convert an output of said spectrum amplitude suppressor to a time domain signal, wherein the spectrum subtracter is further configured to perform fill-up processing, when a subtraction result of said spectrum subtracter is negative or zero, to a spectrum obtained by multiplying a third perceptual weight to a specified spectrum; and a perceptual weight adjuster configured to adjust the third perceptual weight in value through multiplication of a ratio of an input signal amplitude spectrum and an average noise spectrum.

41. A method for noise suppression, comprising:

generating an amplitude spectrum from an input time domain signal;

generating a noise spectrum of the input time domain signal;

determining a signal to noise ratio from the amplitude spectrum and the noise spectrum;

controlling, based on the signal to noise ratio, a first perceptual weight and a second perceptual weight;

subtracting from the amplitude spectrum a product of the noise spectrum and the first perceptual weight controlled on the basis of the signal to noise ratio, to generate a noise-removed spectrum;

multiplying the noise-removed spectrum by the second perceptual weight controlled on the basis of the signal to noise ratio, to generate a noise-suppressed spectrum;

controlling the second perceptual weight such that an amount of noise suppression decreases for at least a portion of the noise-removed spectrum, as the signal-to-noise ratio increases;

converting the noise-suppressed spectrum to an output time domain signal; and modifying at least one of the first perceptual weight and the second perceptual weight at a ratio of a high frequency power to a low frequency power of any one of an input signal amplitude spectrum, a noise spectrum, and an average spectrum of the input signal amplitude spectrum and the noise spectrum.

42. A method for noise suppression, comprising:

generating an amplitude spectrum from an input time domain signal;

generating a noise spectrum of the input time domain signal;

determining a signal to noise ratio from the amplitude spectrum and the noise spectrum;

controlling, based on the signal to noise ratio, a first perceptual weight and a second perceptual weight;

subtracting from the amplitude spectrum a product of the noise spectrum and the first perceptual weight controlled on the basis of the signal to noise ratio, to generate a noise-removed spectrum;

multiplying the noise-removed spectrum by the second perceptual weight controlled on the basis of the signal to noise ratio, to generate a noise-suppressed spectrum;

controlling the second perceptual weight such that an amount of noise suppression decreases for at least a portion of the noise-removed spectrum, as the signal-to-noise ratio increases;

converting the noise-suppressed spectrum to an output time domain signal;

performing fill-up processing, when a subtraction result of said spectrum subtracter is negative or zero, to a spectrum obtained by multiplying a third perceptual weight to a specified spectrum; and modifying the third perceptual weight at a ratio of a high frequency power to a low frequency power of at least one of an input signal amplitude spectrum, a noise spectrum, and an average spectrum of the input signal amplitude spectrum and the noise spectrum.

43. A method for noise suppression, comprising:

generating an amplitude spectrum from an input time domain signal;

generating a noise spectrum of the input time domain signal;

determining a signal to noise ratio from the amplitude spectrum and the noise spectrum;

controlling, based on the signal to noise ratio, a first perceptual weight and a second perceptual weight;

subtracting from the amplitude spectrum a product of the noise spectrum and the first perceptual weight controlled on the basis of the signal to noise ratio, to generate a noise-removed spectrum;

multiplying the noise-removed spectrum by the second perceptual weight controlled on the basis of the signal to noise ratio, to generate a noise-suppressed spectrum;

controlling the second perceptual weight such that an amount of noise suppression decreases for at least a portion of the noise-removed spectrum, as the signal-to-noise ratio increases;

converting the noise-suppressed spectrum to an output time domain signal;

performing fill-up processing, when a subtraction result of said spectrum subtracter is negative or zero, to a spectrum obtained by multiplying a third perceptual weight to a specified spectrum; and controlling the third perceptual weight based on the signal to noise ratio.

44. A method for noise suppression, comprising:

generating an amplitude spectrum from an input time domain signal;

generating a noise spectrum of the input time domain signal;

determining a signal to noise ratio from the amplitude spectrum and the noise spectrum;

controlling, based on the signal to noise ratio, a first perceptual weight and a second perceptual weight;

subtracting from the amplitude spectrum a product of the noise spectrum and the first perceptual weight controlled on the basis of the signal to noise ratio, to generate a noise-removed spectrum;

multiplying the noise-removed spectrum by the second perceptual weight controlled on the basis of the signal to noise ratio, to generate a noise-suppressed spectrum;

controlling the second perceptual weight such that an amount of noise suppression decreases for at least a portion of the noise-removed spectrum, as the signal-to-noise ratio increases;

converting the noise-suppressed spectrum to an output time domain signal;

performing fill-up processing, when a subtraction result of said spectrum subtracter is negative or zero, to a spectrum obtained by multiplying a third perceptual weight to a specified spectrum; and adjusting the third perceptual weight in value through multiplication of a ratio of an input signal amplitude spectrum and an average noise spectrum.

45. A noise suppression device for suppressing noise other than an objective signal contained in an input signal, comprising:

means for controlling first and second perceptual weights for use in performing perceptual weighting, according to the input signal;

means for performing a spectral subtraction on a signal derived from a spectrum of said input signal, using said controlled first perceptual weight, and for performing a spectral amplitude suppression on an other signal derived from the spectrum of said input signal, using said controlled second perceptual weight, to produce a spectrally subtracted and amplitude suppressed signal;

means for controlling the second perceptual weight such that the amount of amplitude suppression decreases for at least a portion of the other signal derived from the spectrum of the input signal, as the signal-to-noise ratio increases; and means for performing perceptual weighting with the second perceptual weight according to a gradient in such a way as to let the amplitude suppression amount increase with increasing frequency of the spectrum of the input signal.

46. The noise suppression device set forth in claim 45, further comprising means for controlling the gradient of the second perceptual weight in such a way as to become moderate with increasing signal-to-noise ratio.

47. A noise suppression device for suppressing noise other than an objective signal contained in an input signal, comprising:

means for controlling first and second perceptual weights for use in performing perceptual weighting, according to the input signal;

means for performing a spectral subtraction on a signal derived from a spectrum of said input signal, using said controlled first perceptual weight, and for performing a spectral amplitude suppression on an other signal derived from the spectrum of said input signal, using said controlled second perceptual weight, to produce a spectrally subtracted and amplitude suppressed signal;

means for controlling the second perceptual weight such that the amount of amplitude suppression decreases for at least a portion of the other signal derived from the spectrum of the input signal, as the signal-to-noise ratio increases;

means for performing perceptual weighting with the first perceptual weight according to a gradient in such a way as to let the subtraction amount decrease with increasing frequency of the spectrum of the input signal; and means for performing perceptual weighting with the second perceptual weight according to a gradient in such a way as to let the amplitude suppression amount increase with increasing frequency of the spectrum of the input signal.

48. The noise suppression device set forth in claim 47, further comprising means for controlling the gradient of the first perceptual weight in such a way as to become steep with increasing signal-to-noise ratio; and further comprising means for controlling the gradient of the second perceptual weight in such a way as to become moderate with increasing signal-to-noise ratio.

* * * * *